(12) United States Patent
Cincotti et al.

(10) Patent No.: US 8,764,456 B2
(45) Date of Patent: Jul. 1, 2014

(54) SIMULATED STRUCTURES FOR URBAN OPERATIONS TRAINING AND METHODS AND SYSTEMS FOR CREATING SAME

(75) Inventors: K. Dominic Cincotti, Fayetteville, NC (US); Trevor J. Kracker, Lumberton, NC (US)

(73) Assignee: Military Wraps, Inc., Lumberton, NC (US)

( * ) Notice: Subject to any disclaimer, the term of this patent is extended or adjusted under 35 U.S.C. 154(b) by 535 days.

(21) Appl. No.: 12/830,179

(22) Filed: Jul. 2, 2010

(65) Prior Publication Data

US 2011/0171623 A1 Jul. 14, 2011

Related U.S. Application Data

(63) Continuation-in-part of application No. 12/229,047, filed on Aug. 19, 2008, now Pat. No. 8,597,026.

(51) Int. Cl.
*G09B 19/00* (2006.01)
(52) U.S. Cl.
USPC .......................................................... 434/365
(58) Field of Classification Search
USPC .......................................................... 52/79.1
See application file for complete search history.

(56) References Cited

U.S. PATENT DOCUMENTS

| | | | | |
|---|---|---|---|---|
| 2,616,145 A | * | 11/1952 | Dufford | 249/15 |
| 3,784,054 A | * | 1/1974 | Mautz | 220/534 |
| 3,802,098 A | * | 4/1974 | Sampson et al. | 434/20 |
| 4,001,949 A | * | 1/1977 | Francis | 434/226 |
| 4,234,911 A | * | 11/1980 | Faith | 362/111 |
| 4,526,548 A | * | 7/1985 | Livingston | 434/226 |
| 4,809,470 A | * | 3/1989 | Bauer et al. | 52/97 |
| 5,203,707 A | * | 4/1993 | Musto et al. | 434/226 |
| 5,219,316 A | | 6/1993 | Huffman | |
| 5,226,818 A | * | 7/1993 | Feiock et al. | 434/226 |
| 5,242,172 A | | 9/1993 | Bateman | |
| 5,316,484 A | * | 5/1994 | Layton et al. | 434/226 |
| 5,320,358 A | * | 6/1994 | Jones | 273/371 |
| 5,496,176 A | * | 3/1996 | Swanson | 434/154 |
| 5,599,187 A | * | 2/1997 | Mesiano | 434/19 |
| 5,822,936 A | | 10/1998 | Bateman | |
| 5,904,410 A | * | 5/1999 | Davies | 312/259 |

(Continued)

FOREIGN PATENT DOCUMENTS

WO WO 2009/126173 10/2009
WO WO 2011/069112 6/2011

OTHER PUBLICATIONS

Dana et al. "Reflectance and Texture of Real World Surfaces" ACM Transactions on Graphics. vol. 18 No. 1. 1999 p. 1-34.*

(Continued)

*Primary Examiner* — Robert J Utama
(74) *Attorney, Agent, or Firm* — J. Bennett Mullinax, LLC

(57) ABSTRACT

Methods, systems, and structures are provided to creating a simulated structure for urban operations training based on a structure to be simulated. The simulated structure can include a base structure having at least one wall thereon. The simulated structure can also include one or more wall segments having a textured surface to securement to the at least one wall of the base structure. One or more wrapping material panels with one or more images printed thereon applied to the textured surface of the one or more wall segments so that the simulated structure has realistic visual characteristics representative of a mission site or a mission scenario.

25 Claims, 30 Drawing Sheets

(56) References Cited

U.S. PATENT DOCUMENTS

| | | | |
|---|---|---|---|
| 5,924,131 A * | 7/1999 | Wilkinson | 2/69 |
| 5,951,016 A | 9/1999 | Bateman | |
| 6,081,275 A * | 6/2000 | Kojima | 345/427 |
| 6,178,713 B1 * | 1/2001 | Delie et al. | 52/506.08 |
| 6,179,620 B1 * | 1/2001 | Schmid | 434/226 |
| 6,235,367 B1 * | 5/2001 | Holmes et al. | 428/45 |
| 6,257,583 B1 * | 7/2001 | Roberson | 273/390 |
| 6,354,212 B1 * | 3/2002 | Krinsky | 101/483 |
| 6,497,442 B1 * | 12/2002 | Wacker | 296/24.32 |
| 6,579,097 B1 | 6/2003 | Sampson et al. | |
| 6,631,683 B2 * | 10/2003 | Krinsky | 101/483 |
| 6,959,646 B2 * | 11/2005 | Fujii et al. | 101/484 |
| 7,011,528 B2 * | 3/2006 | Tweet et al. | 434/262 |
| 7,074,043 B1 * | 7/2006 | Jacobson | 434/226 |
| 7,329,127 B2 * | 2/2008 | Kendir et al. | 434/21 |
| 7,922,492 B2 * | 4/2011 | Nielsen et al. | 434/80 |
| 8,123,526 B2 * | 2/2012 | Hoover et al. | 434/21 |
| 8,597,026 B2 | 12/2013 | Cincotti et al. | |
| 2002/0029133 A1 * | 3/2002 | Imai | 703/1 |
| 2002/0069078 A1 * | 6/2002 | Goldstein | 705/1 |
| 2003/0027103 A1 * | 2/2003 | Preston et al. | 434/11 |
| 2003/0227440 A1 * | 12/2003 | Fager et al. | 345/156 |
| 2004/0049992 A1 * | 3/2004 | Seavy | 52/79.1 |
| 2004/0196282 A1 * | 10/2004 | Oh | 345/419 |
| 2005/0005339 A1 * | 1/2005 | Johnson | 2/69 |
| 2005/0071040 A1 * | 3/2005 | Kirila, II | 700/130 |
| 2005/0079330 A1 | 4/2005 | Tanel | |
| 2005/0100717 A1 | 5/2005 | Riddle | |
| 2005/0128212 A1 * | 6/2005 | Edecker et al. | 345/582 |
| 2005/0158101 A1 * | 7/2005 | Silverbrook et al. | 400/62 |
| 2005/0200682 A1 * | 9/2005 | Silverbrook et al. | 347/104 |
| 2005/0272011 A1 | 12/2005 | Herman et al. | |
| 2006/0107985 A1 | 5/2006 | Sovine | |
| 2006/0271860 A1 * | 11/2006 | Walter | 715/738 |
| 2007/0020585 A1 * | 1/2007 | Bjorkman et al. | 434/11 |
| 2007/0113487 A1 * | 5/2007 | Warminsky | 52/79.1 |
| 2007/0117503 A1 * | 5/2007 | Warminsky | 454/187 |
| 2007/0118805 A1 | 5/2007 | Kraus et al. | |
| 2009/0111073 A1 * | 4/2009 | Stanley | 434/21 |
| 2009/0237564 A1 | 9/2009 | Kikinis et al. | |
| 2009/0286208 A1 * | 11/2009 | Coleman | 434/20 |
| 2010/0013162 A1 * | 1/2010 | Wright et al. | 273/406 |
| 2010/0064596 A1 * | 3/2010 | Bowsher | 52/29 |
| 2010/0225064 A1 * | 9/2010 | Deatherage, Jr. | 273/405 |
| 2010/0275797 A1 * | 11/2010 | Cortina et al. | 101/424 |
| 2011/0035708 A1 * | 2/2011 | Damale | 715/863 |
| 2011/0171623 A1 * | 7/2011 | Cincotti et al. | 434/365 |
| 2011/0256511 A1 * | 10/2011 | Cragg | 434/11 |
| 2011/0300514 A1 * | 12/2011 | Didier et al. | 434/11 |
| 2012/0166146 A1 | 6/2012 | Cincotti | |

OTHER PUBLICATIONS

Lamothe, Dan, "Training Gets 'Hyper-Realistic'," Marine Corps Times, Nov. 2, 2009.
Meggitt Training Systems Canada Brochure, "Unmanned Target Drone System: Aerial Air-Launched Target Drone," at least as early as Mar. 2012.
Meggitt Training Systems Canada Brochure, "Universal Target Control Station: Multiple Target Command & Control," at least as early as Mar. 2012.
Ad Graphics, Inc. Advertisement, Sign Business Magazine, Nov. 1993.
Photograph of a building in Northern Virginia with graphic artwork applied thereto. This artwork has allegedly been on the building since at least as early as 1993.
Homepage for Ad Graphics website, www.adgraphics.us, Dec. 22, 2008.
Contact and FAQs webpages from Sign Farm website, www.signfarm.com, Dec. 16, 2008.
RAND Corporation, "Preparing for the Proven Inevitable: An Urban Operations Training Strategy for America's Joing Force," 2006, Part 1.
RAND Corporation, "Preparing for the Proven Inevitable: An Urban Operations Training Strategy for America's Joing Force," 2006, Part 2.
RAND Corporation, "Preparing for the Proven Inevitable: An Urban Operations Training Strategy for America's Joing Force," 2006, Part 3.
RAND Corporation, "Preparing for the Proven Inevitable: An Urban Operations Training Strategy for America's Joing Force," 2006, Part 4.
RAND Corporation, "Preparing for the Proven Inevitable: An Urban Operations Training Strategy for America's Joing Force," 2006, Part 5.
RAND Corporation, "Preparing for the Proven Inevitable: An Urban Operations Training Strategy for America's Joing Force," 2006, Part 6.
(MOUT) Shoothouse Statics, Project Reality website forum thread, realitymod.com/forum/f388-pr-bf2-community-modding/56936-request-mout-shoothouse-statics.html, posted Apr. 1, 2009.
Urban Warfare, webpage, Wikipedia, free encyclopedia, www.en.wikipedia.org/wiki/Urban_warfare, Mar. 30, 2012.
Urban Warfare, webpage, Wikipedia, free encyclopedia, www.en.wikipedia.org/w/index.php?title=Urban_warfare&oldid=370319040, at least as early as Jun. 26, 2010 [ret. on Apr. 12, 2012].
Urban Warfare,webpage, Wikipedia, free encyclopedia, www.en.wikipedia.org/w/index.php?title=Urban_warfare&oldid=229300924, at least as early as Aug. 1, 2008 [ret. on Apr. 12, 2012].
Meggitt Training Systems Canada Brochure, Vindicator II: Realistic, Cost-Effective Threat Simulation, at least as early as Mar. 2012.
Meggitt Training Systems Canada Brochure, Unmanned Target Drone System: Aerial Radar Target Drone DT25 R, at least as early as Mar. 2012.
Meggitt Training Systems Canada Brochure, TRX-9 Radar Augmented Towed Target With Microdops Scoring, at least as early as Mar. 2012.
Witte, Tom, "A Survey of 3-D Urban Mapping and Visualization Capabilities," conference paper, The International Society for Phototgrammetry and Remote Sensing Joint Symposia URBAN-URS2005, Mar. 14-16, 2005, Tempe, AZ vol. XXXVI-8/W27, 2005.
Sejnowski, Terry, ask the Brains column, Response to: "Is It True That When We Drive, Walk or Reach, for Something Our Brain Performs Calculations? Is This Ability Learned or Innate?," Scientific American Mind, published by Scieintific American, Inc., Nov./Dec. 2009.
Schuett, Aaron, "Taking Technology to New Heights," webpage article, Moldmaking Technology website, www.moldmakingtechnolgy.com/articles/taking-technology-to-new-heights, posted Nov. 1, 2006 [retrieved on Mar. 30, 2012].
Meggitt Training Systems Canada Brochure, TLX-1 Low Level Height-Keeping Tow Target, at least as early as Mar. 2012.
Meggitt Training Systems Canada Brochure, TDK-39A Aerial Gunnery Tow Target, at least as early as Mar. 2012.
Meggitt Defense Systems Brochure, Model RM-30A1 Reeling Machine-Launcher, at least as early as Mar. 2012.
I/ITSEC Newsletter, Published by NTSA, vol. 8, No. 4, Nov. 2009.
Boessenkool, A., "Lockheed Martin Looks to Nanotechnology," Lockheed Martin, Sep. 12, 2008.
Meggitt Training Systems Canada Brochure, "Pop-Up Helicopter Target: Threat Simulation/Unmanned Operations," at least as early as Mar. 2012.
Action Target Brochure, "Control Systems: Target Control Module," at least as early as Jun. 2010.
Meggitt Training Systems Canada Brochure, "Scanning Projectile Impact Evaluation System (SPIES)," at least as early as Mar. 2012.
Geospatial Intelligence, webpage, Wikipedia, free encyclopedia, www.en.wikipedia.org/wiki/Geospatial_intelligence, Jun. 29, 2010.
Urban Warfare, webpage, Wikipedia, free encyclopedia, www.en.wikipedia.org/wiki/Urban_warfare, Jun. 29, 2010.
U.S. Appl. No. 12/229,047.
U.S. Appl. No. 12/960,278.
International Search Report and Written Opinion for PCT/US08/73590 dated Feb. 18, 2009.

(56) References Cited

OTHER PUBLICATIONS

International Search Report and Written Opinion for PCT/US10/58969 dated Mar. 10, 2011.
Berlin Wallpaper—Animals of the Wild [online]. Jan. 19, 2008 [retrieved on Feb. 3, 2009]. www.berlinwallpaper.com/wallsofthewild/Default.asp>; p. 1.
Chwang, Anna B., "Thin Film Encapsulated Flexible Organic Electroluminescent Displays," Appl. Phys. Lett., vol. 83, 413, Jul. 21, 2003.
Eltron, "Advanced Nano-Phase Materials Promise to Revolutionize Solid State Power Generation, Peltier Heating/Cooling," Eltron Research and Development Tech Brief, 2009.
Florida, R., "Small Science with Big Promise—Nanotechnology Research at NJIT," NJIT Magazine, pp. 14-17, at least as early as Sep. 10, 2008.
Gassler, John Jr.: "Military Wraps: The Next Generation in Combat Training Solutions," Special Operations Report, vol. 16, Sep. 15, 2008.
Greenemeier, Larry: "Sticky Savior: U.S. Army Readies a New Blast-Protection Adhesive . . . " http://www.scientificamerican.com/article.cfm?id=army-polymer-adhesive, Dec. 18, 2008.
"How to Disappear," The Economist Technology Quarterly, Sep. 6, 2008, pp. 21 and 24.
KB Port Simulation Environments[online]. Jan. 25, 2008 [retrieved Jan. 28, 2009]. www.kbport.com/products/pse-main.php?KeepThis=true&TB_iframe=true&width=805>; p. 1-2; Figs. 1-2.
McKee, et al., "Future Combat Vehicle Protected by an Active Camouflage System," Military Technology (Miltech), Jul. 17, 2009.
Moyle, Wendy, Personalized Standees . . . [online] Apr. 10, 2008 [ret. Feb. 3, 2009]. http://shindigzparty.wordpress.com/2008/04/10/personalized-standees-and-wall-graphics-for-mothers-day/>.
Navy Press Release No. 597-08, Jul. 15, 2008.
Yusuf, A., "An approach for real world data modelling with the 3D terrestrial laser scanner for built environment" Construction 16 (2007) 816-829.
Hardwick, et al., "A New Look at the InfantryCompany," Infantry Magazine, Nov.-Dec. 2004.
www.actiontarget.com, Mar.-Apr. 2012.
www.actiontarget.com, Jun. 29, 2010.
Meggitt Training Systems Canada Brochure, Barracuda: Maritime Threat Simulation/Unmanned Operations, at least as early as Mar. 2012.
Meggitt Training Systems Canada Brochure, Badger: A Flexible and Realistic Tank Target, at least as early as Mar. 2012.
Meggitt Training Systems Canada Brochure, Entry Control Point Moving Target, at least as early as Mar. 2012.
Grossman, Lt. Col. Dave, Evolution of Weaponry, www.killology.com/Weaponry.htm, at least as early as 2006 [retrieved on Apr. 12, 2012].
Geospatial Intelligence,webpage, Wikipedia, free encyclopedia, www.en.wikipedia.org/w/index.php?title=Geospatial_intelligence& oldid=370566203, at least as early as Jun. 28, 2010.
Geospatial Intelligence,webpage, Wikipedia, free encyclopedia, www.en.wikipedia.org/wiki/Geospatial_intelligence, Apr. 12, 2012.
Geospatial Intelligence,webpage, Wikipedia, free encyclopedia, www.en.wikipedia.org/w/index.php?title=Geospatial_intelligence& oldid=230659229, at least as early as Aug. 8, 2008.
Cote, Paul, GIS Manual: Exchanging Data between GIS and CAD Formats, webpage, www.gsd.harvard.edu/gis/manual/cad/index.htm#overview, at least as early as 2010 [ret. Mar. 30, 2012].
Cote, Paul, GIS Manual: Georeferencing Images and CAD Data, webpage, www.gsd.harvard.edu/gis/manual/georeferencing/index.htm, at least as early as 2010 [retrieved Mar. 30, 2012].
Cote, Paul, GIS Manual: Spatial Information in Design Culture, webpage, www.gsd.harvard.edu/gis/manual/projection_fundamentals/, at least as early as 2010 [ret. Mar. 30, 2012].
McCarty, Brad, Google Adding Interiors . . . , web mag. article, The Next Web, thenextweb.com/google/2010/04/22/google-adding-store-interiors-street-view/, Apr. 10, 2010 [ret. Mar. 30, 2012].
Meggitt Defense Systems Brochure, GT-400 Glide Target, at least as early as Mar. 2012.
Meggitt Training Systems Canada Brochure, Hammerhead: Maritime Threat Simulation, at least as early as Mar. 2012.
Meggitt Training Systems Canada Brochure, High Speed Inflatable Towed Target (HSITT): Maritime Threat Simulation, at least as early as Mar. 2012.
Koboyashi, Y., "Photogrammetry and 3D city modelling." Digital Architecture and Construction. vol. 90. 2006.
Coxworth, Ben, "Laser Backpack Created for 3D Mapping," web magazine GIZMAG, www.gizmag.com/3d-mapping-laser-backpack/16338/, Sep. 10, 2010 [retrieved on Apr. 12, 2012].
Action Target Brochure, MATCH—Modular Armored Tactical Combat House, at least as early as Jun. 2010.
Meggitt Training Systems Brochures, Stationary Armored Target. Moving Armored Target System, Moving Armored Target, at least as early as Mar. 2012.
Meggitt Training Systems Canada website, www.meggittcanada.com, Mar.-Apr. 2012.
Meggitt Training Systems Brochure, Multi-Function Stationary Infantry Target System (MF-SIT), at least as early as Mar. 2012.
Meggitt Training Systems Brochure, RangeMaster Control System, at least as early as Mar. 2012.
Meggitt Training Systems Brochure, Meggitt Shott house (Shoot House for Optimized Tactical Training), at least as early as Mar. 2012.
Meggitt Training Systems Brochure, Stationary Infantry Target System, at least as early as Mar. 2012.
Meggitt Training Systems website, www.meggitttrainingsystems.com, Mar.-Apr. 2012.
Meggitt Training Systems Canada Brochure, Mosquito Unmanned Helicopter Vehicle-Target (UHV-T): Cost-Effective, Subscale Helicopter Threat . . . , at least as early as Mar. 2012.
NTC Acquisition Command- Request for Proposals,Solicitation No. W9124B-08-R-0027, dated Jul. 28, 2008.
Hakim, "A Mobile System for indoor 3-D mapping and positioning" Optical 3-D measurement techinque 1997.
Non-final Office Action for U.S. Appl. No. 12/229,047 mailed Jun. 11, 2012, 30 pages.
Final Office Action for U.S. Appl. No. 12/229,047 mailed Oct. 17, 2012, 20 pages.
Notice of Allowance for U.S. Appl. No. 12/229,047, mailed Jul. 30, 2013, 29 pages.
Non-final Office Action for U.S. Appl. No. 12/960,278 mailed Aug. 9, 2013, 42 pages.
I/ITSEC Interservice/Industry Training, Simulation & Education Conference Program Guide, Nov. 30-Dec. 3, 2009, part 1 of 4.
I/ITSEC Interservice/Industry Training, Simulation & Education Conference Program Guide, Nov. 30-Dec. 3, 2009, part 2 of 4.
I/ITSEC Interservice/Industry Training, Simulation & Education Conference Program Guide, Nov. 30-Dec. 3, 2009, part 3 of 4.
I/ITSEC Interservice/Industry Training, Simulation & Education Conference Program Guide, Nov. 30-Dec. 3, 2009, part 4 of 4.
Meggitt Training Systems Canada Brochure, "Unmanned Target Drone System: Aerial Radar Sea Skimming Target Drone," at least as early as Mar. 2012.
Meggitt Training Systems Canada Brochure, "Unmanned Target Drone System: Aerial Radar Target Drone DT35," at least as early as Mar. 2012.

* cited by examiner

SIMULATED STRUCTURES FOR URBAN OPERATIONS TRAINING AND METHODS AND SYSTEMS FOR CREATING SAME

RELATED APPLICATIONS

This application is a continuation-in-part patent application which claims the benefit of the filing date of U.S. patent application Ser. No. 12/229,047, filed Aug. 19, 2008, now U.S. Pat. No. 8,597,026 the disclosure of which is incorporated herein by reference in its entirety. The presently disclosed subject matter claims the benefit of U.S. Provisional Patent Application Ser. No. 61/222,771, filed Jul. 2, 2009; the disclosure of which is also incorporated herein by reference in its entirety.

TECHNICAL FIELD

Generally, methods, systems and structures used in creating training systems are generally provided. More particularly, methods, systems and structures are provided that can be used in replicating structures to be simulated for modern urban operations training systems.

BACKGROUND

As more of the world's population moves into an urban environment, battles that are fought in urban areas will also increase. Therefore, soldiers must train for the possibility of having to enter buildings, positively distinguish between friend and foe, and act accordingly. Such training is also needed for law enforcement as well as private security companies. The current shift in doctrine toward more and better urban training for U.S. military, law enforcement and private security personnel is a direct result of the increase in number of armed conflicts and perceived threats in urban environments.

Urban operations have challenged and continue to challenge the world's most sophisticated militaries. Still reliant on technologies, doctrines, and training at times overly influenced by the Cold War—a period during which neither major adversary wished to fight in large metropolitan areas—operations in built-up areas have subsequently often proven unpleasantly difficult for U.S. forces. Despite the passage of more than a decade since the end of the Cold War and the momentous change in the strategic environment, the U.S. armed forces have thus far been unable to adequately reproduce the challenges their soldiers, sailors, marines, and airmen meet in the towns and cities of Afghanistan and Iraq.

MOUT Facilities and MOUT Training continues to grow in doctrinal prominence, size, number of trainees, and capabilities as they are increased to satisfy multi-unit to Battalion-size Joint Force MOUT Training. The reliance on highly realistic pre-deployment training has the goal of preparing our military for the chaos that is Urban Warfare and Close-Quarters Combat.

It is an urgent need that our MOUT resources be carefully examined. MOUT Training Facilities have already been stretched thin, due to the ever-increasing number of Trainees who require this training. Additionally, simultaneous deployments of troops in both Iraq and Afghanistan have demonstrated the need to train for BOTH (multiple) scenarios.

The MOUT facilities do a good job of replicating the physical layout of structures for potential or future Urban Operation Mission Sites (i.e. stairwells, doors and windows). Notably absent are the necessary visual details to provide immersive training realism. MOUT Facilities are often left single tone in appearance-lacking crucial visual detail for immersive realism training.

For these reasons, MOUT facilities are not as effective as they could be for preparing the trainee for filtering the plethora of visual details to make tactical judgments because not enough of the realistic visual details are included. Part of the reason for this is that houses, rooms and sites often must be used to train for multiple potential or real scenarios that occur, many times by multiple units with different needs or goals.

SUMMARY

It is an object of the presently disclosed subject matter to provide methods, systems, and structures for replicating a structure to be simulated. More particularly, methods, systems and structures used in replicating structures to be simulated for modern urban operations training systems are provided.

An object of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

DETAILED DESCRIPTION

Figure 1A:
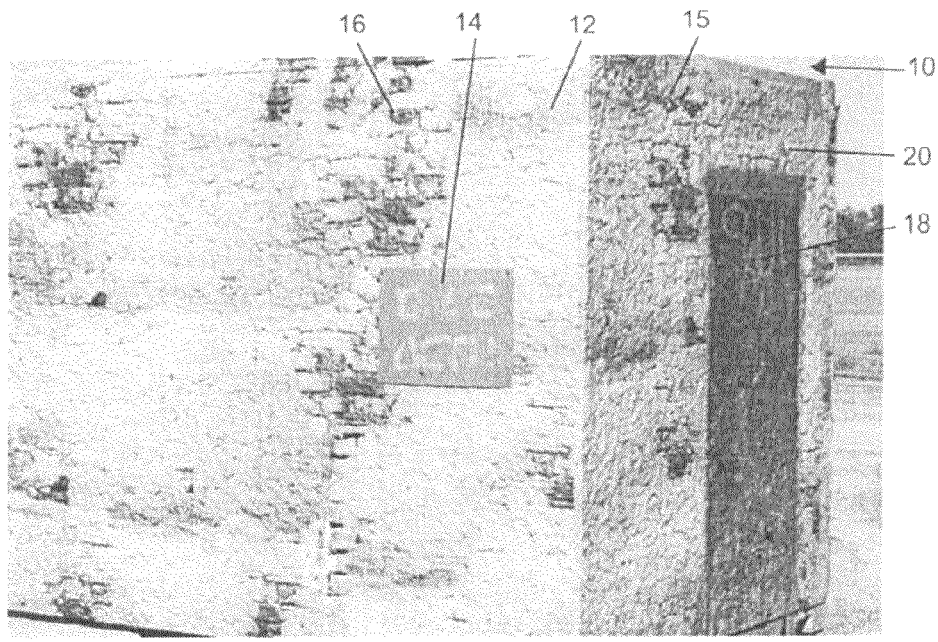
FIGS. 1A and 1B illustrate perspective views of an embodiment of a simulated structure according to the present subject matter.

Reference will now be made in detail to the description of the present subject matter, one or more examples of which are shown in the Figures. Each example is provided to explain the subject matter and not as a limitation. In fact, features illustrated or described as part of one embodiment can be used in another embodiment to yield still a further embodiment. It is intended that the present subject matter cover such modifications and variations.

"Simulated structure" as used herein means a structure such as a shoot house, a modern operational urban training house, a MATCH house, an urban operation or close quarters combat training facility, that accurately re-creates situational realism with realistic visual characteristics by utilizing site-specific photographic images and large-format printing and the application of same.

"Site-specific" as used herein means a specific location or article such as a specific building, facility or other structure or physical item, or the architectural or structural characteristics of buildings, facilities or other structures or physical items which would be found in the intended operating environment of a mission site or a mission scenario.

"Image-editing program" as used herein means a computer program used to edit or change an image. Examples include Adobe PHOTOSHOP®, PAINT.NET® and PICASA®.

"Image" as used herein means the optical counterpart of an object or environment produced by graphical drawing by a person, a device (such as a computer) or a combination thereof. The optical counterpart of the object can also be produced by an optical device, electromechanical device, or electronic device. As used herein, "image" can be used to refer to a whole image, for example, a photographic image as taken by a photographic device, or a portion thereof.

"Visual Imagery" as used herein can mean an image or visual depiction of an object or thing that can be measured and/or manipulated on a data processor such as a computer or the like.

"Textural Imagery" as used herein can mean the dimensions and tactical characteristics of an object or thing based on observation of the object or thing that can be measured and/or manipulated on a data processor such as a computer or the like.

"First responder" as used herein means persons or organizations that can be the first medically-trained responders to arrive on scene of an emergency, accident, natural or human-made disaster, or similar event. Examples of such responders can include, but are not limited to, police or other law enforcement, firefighters, emergency medical services, or the like.

"Mission" as used herein means any long term or short term plan for military, law enforcement, or other first responder personnel that defines goals and objectives to be reached by the personnel during a definite or indefinite time period. The term "mission" as used herein can also include training for common events that military, law enforcement, or other first responder personnel may encounter during the course of their duties.

"Mission site" as used herein means the location or region where a mission is to be carried out.

"Mission scenario" as used herein means the circumstances surrounding a mission that is to be carried out or training for common events that military, law enforcement, or other first responder personnel may encounter during the course of their duties.

Photo-realistic immersive firearms or tactics training scenario systems allow for photo-realistic details and site-specific images of the intended operational environment to be applied to interiors and/or exteriors of training facilities, shoot house or other structures. This facilitates the capability to rapidly reconfigure, or customize efficiently for different scenarios, crisis situations and pre-deployment mission rehearsals resulting in more realistic and improved training. A quickly convertible scenario facade replication system for multi-use urban operations training facilities is needed to specifically address the unique demands of MOUT facilities and the related MOUT doctrine. A situational realism can be accurately re-created by utilizing realistic texture to simulate the building materials and type of construction used in the specific-site being used and site-specific photographic images and large-format printing and the application of the same on interiors and/or exteriors of shoot house or other structures to provide great detail and ease of use.

Figure 1B:
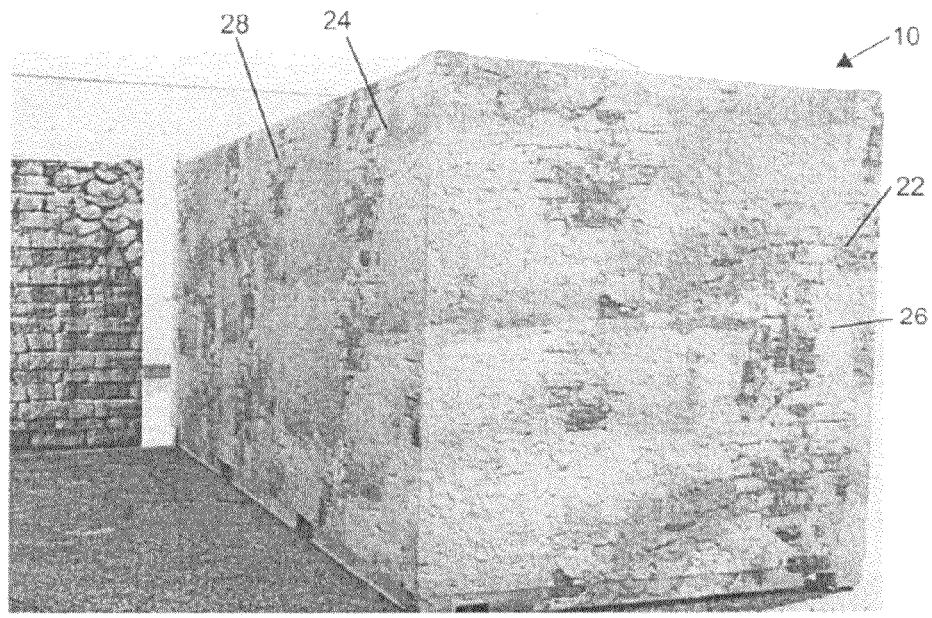

FIGS. 1A and 1B illustrate a structure, generally designated 10, that can be used in modern operational urban training to facilitate operational conditioning for a combatant. In particular, structure 10 can be a conex container, or cargo hull, that has been transformed into a modern operational urban training structure by adding realistic detail to the exterior of the container that is specific to the type of training being performed for a specific region. The realistic detail comes from intelligence and/or other information collected about the location that is to be simulated or recreated. The information is used to create wall segments that have a texture surface that simulates the outer surface of a structure being simulated or recreated. These textured wall segments can be attached to the exterior walls of the conex container (and interior walls of the conex container as needed). The information is also used to create imagery that simulates the outer surface of a structure being simulated or recreated, such as photographic and/or computer enhanced images, that are printed on a wrapping material. The wrapping material, such as a polyvinyl chloride film described in more detail below, can be applied in panels over the textured wall segments to add imagery to the texture of the textured wall segments. The wrapping material can be applied to the textured wall segments before or after attachment to the structure 10 such as a conex container.

Once the textured wall segments are attached to the structure 10 and the textured wall segments wrapped with wrapping material panels as described below, realistic looking façades 12, 15, 22, 24 can be created on all walls 16, 20, 26, 28 of the structure 10 that have realistic detail to enhance the training to be performed. For example, by attachment of the textured wall segments and wrapping material panels, a façade 12 can be created on wall 16 and a façade 15 can created on wall 20 as shown in FIG. 1A. Similarly, a façade 22 can be created on wall 26 and a façade 24 can created on wall 28 as shown in FIG. 1B.

Other architectural and/or decorative features can be added to enhance the façade 12. For example, in the embodiment shown, a sign 14 is added to a side wall 16 and a door 18 is added on a front wall 20. Such added architectural and/or decorative features can be part of the imagery printed on the original wrapping material or can be an application of an additional section of wrapping material. Additionally, the added architectural and/or decorative features can be structural modifications or physical additions to the conex container to create the structure 10.

Structure 10 can be a modular unit that can be used singularly or with a plurality of modular units to create a tactical training facility. While shown and described herein as modified conex containers, such modular units can be any prefabricated structures that are generally interchangeable and can be used with other modular units to assemble a larger structure that is representative of an intended target. For example, the modular units can be specially created modular structures, instead of modified conex containers. For instance, each modular units can include interior and exterior panels that consist of standard dimension panels mounted on a grid system, and can include solid panels (single and double sided), window panels, and door panels, with or without breach capabilities. The interior of each modular unit can include bullet containment walls configured to allow live-fire within the modular units. More specifically, the walls in each modular unit can include armored panels and/or armored steel plates to maintain the integrity of the walls when rounds of bullets are shot in the modular units. Alternatively, the modular units can be configured for simulated munitions, such as paintballs. In this embodiment, lightweight walls can be used in place of the bullet containment walls.

To create a quickly convertible façade replication system that is applicable in training for specific scenarios and locations, information and intelligence about the location that is to replicated or simulated must be gathered. Necessary detailed data can be gathered from different sources to create urban mapping and visualization intelligence that can be used to manufacture the façades 12 that can be used to create structures 10 and create a layout of a plurality of such structures 10 that replicates or simulates the geospatial relationships of buildings in an area of intended urban operations.

Figure 2A:
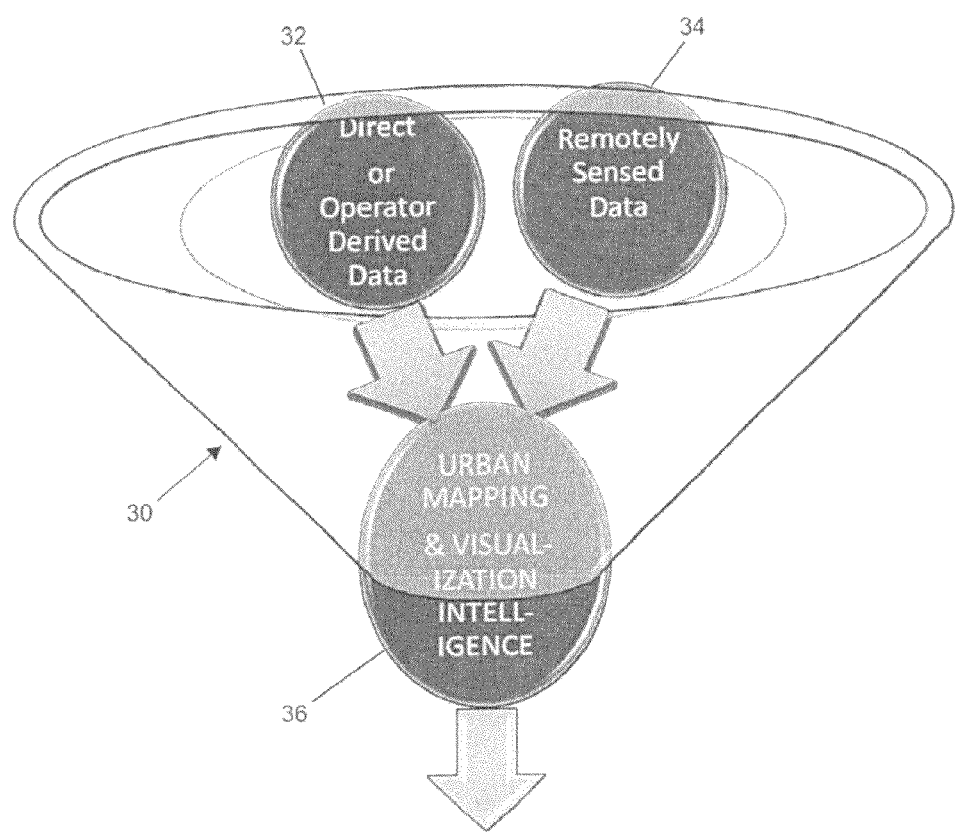
FIG. 2A illustrates a simple schematic diagram of a processor to generate geospatial intelligence for use in creating a simulated structure according to the present subject matter.

FIG. 2A show a simple schematic of a data collection and manipulation process 30. Data collection and manipulation process 30 can be used to transform raw data into urban mapping and visualization intelligence 36. The data that is provided for data collection and manipulation process 30 can derive from such sources as, for example, direct or operator derived data 32 and remotely captured data 34.

Direct or operator derived data 32 can comprise, for example, information collected by field agents using image capturing devices, such as video or digital cameras, radar, lidar, sonar, or the like that can be used directly by an operator. Direct or operator derived data 32 can also comprise operator input about and/or descriptions of a location such as the spatial relationship of key sites at the location, the surrounding terrain, building exterior and/or interior information or the like that can be entered into a data processor or data collection apparatus. Such direct or operator derived data 32 can help provide further details that can be used to determine the physical appearance of the facades 12 to be used.

Remotely captured data 34 can comprise, for example, satellite collected information, sensing and/or image capturing devices that can be remotely controlled, sensing and/or image capturing devices that can be automatically operated, or the like. For example, satellite collected information can include satellite images and data collected by a satellite that provide geospatial information and location imagery. Sensing and/or image capturing devices that can be remotely controlled can include such devices that can be controlled by an operator remotely from the actual location that is be observed or measured. These remotely controlled sensing devices or image capturing devices can be located in a stationary position or can be part of a mobile unit. For example, sensing devices or image capturing devices can be secured to drones, robots, or other unmanned aerial and earthbound vehicles or the like. The controller for such unmanned vehicles can also control the image capturing device or other sensing device that is used to collect information. Sensing and/or image capturing devices that can be automatically operated can include devices that are activated by sensor to start recording information. For example, digital cameras that are activated by thermal levels or by light levels to capture an image or video.

Both the direct or operator derived data 32 and the remotely captured data 34 can be received by a data collection apparatus. A data collection apparatus can be a wide range of devices or apparatuses. For example, the data collection apparatuses can be cameras, thermal readers, surveying instrumentation, or the like. Additionally, for the direct or operator derived data 32, the data collection apparatus can be a personal or network computer into which data such as eyewitness descriptions of a location can be manually entered.

Figure 2B:
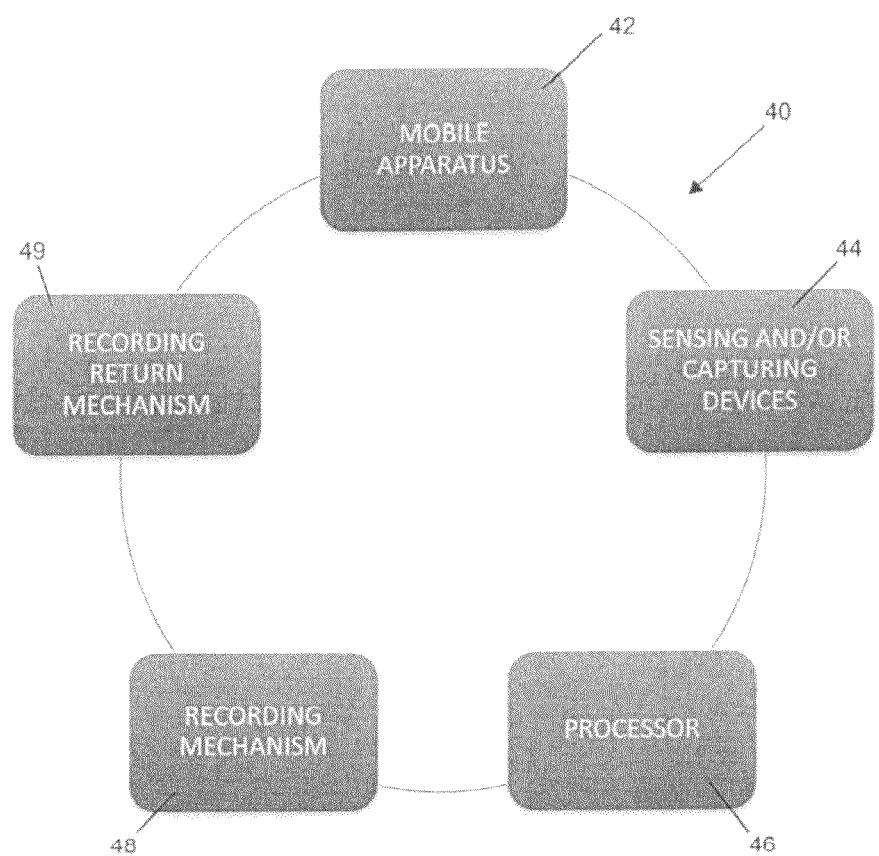
FIG. 2B illustrates a simple schematic diagram of components of an embodiment of a data collection apparatus according to the present subject matter.

FIG. 2B illustrates examples of components of other data collection apparatuses that can be used to collect remotely captured data 34 (see FIG. 2A). For example, a data collection apparatus 40 can be used to collect remotely captured data 34 on the move. Data collection apparatus 40 can include mobile apparatus 42, sensing and/or image capturing devices 44, signal processors 46, a recording mechanism 48 and a recording return mechanism 49. Mobile apparatus 42 can be the apparatus that permits the data to be collected remotely. For example, the mobile apparatus 42 can be manned aircraft, an unmanned aircraft such as an aerial drone, manned vehicles or unmanned earthbound vehicle, such as a mobile robot.

The mobile apparatus can have one or more sensing and/or image capturing devices 44. Sensing and/or image capturing devices 44 are the actual devices that take measures of some sort or capture images of some sort. For example, the sensing and/or image capturing devices can include video cameras, digital still cameras, sonar, radar, lidar synthetic-aperture radar, multi-spectral imaging, hyper-spectral imaging, full-spectral imaging, foliage penetration radar, electro-optic infrared, or the like.

The data collection apparatus 40 can be configured to include a processor 46 to process the signals or other data generated by the one or more sensing and/or image capturing devices 44 to turn this raw data into useful data/information. The data collection apparatus 40 can further include a recording mechanism 48 that records the useful data/information generated by processor 46. For example, the recording mechanism can store useful data/information for later transmission to a data collection center. For example, data collection apparatus 40 can include a recording return mechanism that transmits the recorded useful data/information to such a data collection center while the data collection apparatus 40 is still out in the field. Alternatively, the recorded useful data/information can be obtained upon the return of the mobile apparatus to its home base.

The raw direct or operator derived data 32 and/or the remotely sensed data 34 can be analyzed, edited and organized in data collection and manipulation process 30 to provide urban mapping and visualization intelligence 36 about the mission environment that is to be replicated as shown in FIG. 2A. Urban mapping and visualization intelligence 36 can then be used to create used to manufacture the façades 12 that can be used to create structures 10 and create a layout of a plurality of such structures 10 that replicates or simulates the geospatial relationships of buildings in an area of intended urban operations.

Figure 2C:
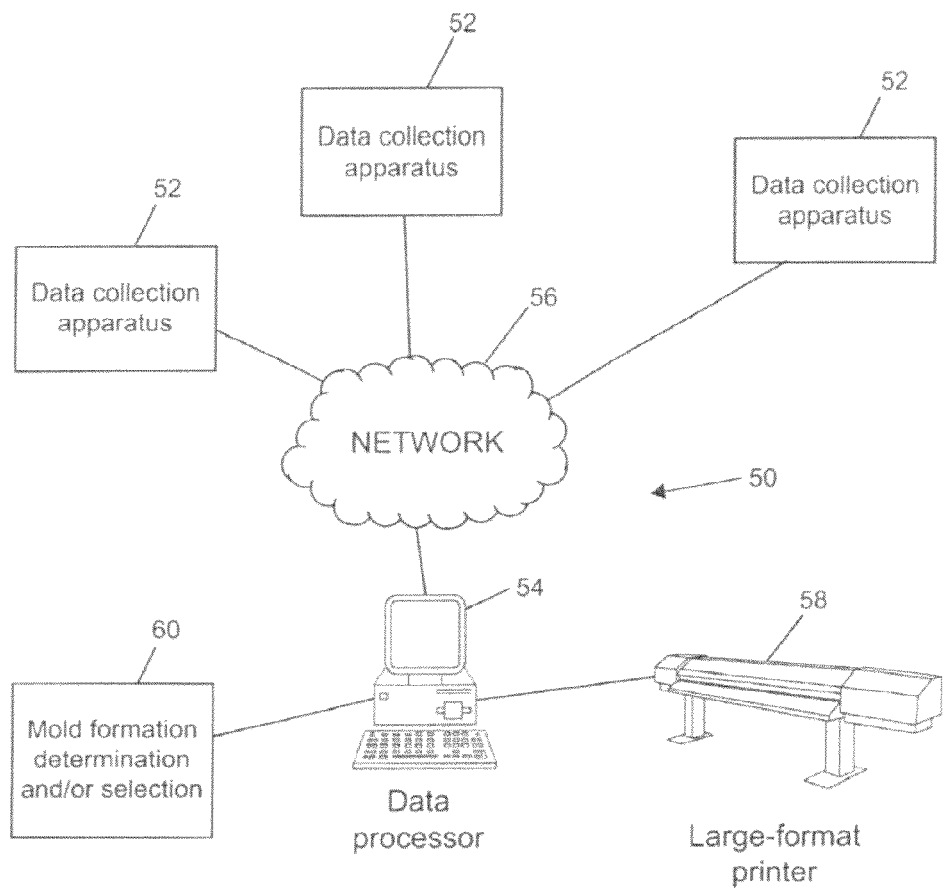
FIG. 2C illustrates a simple schematic diagram of portions of an embodiment of a system that can be used in replicating a structure to be simulated according to the present subject matter.

FIG. 2C illustrates the façade creation system 50 for the structures 10 shown in FIGS. 1A and 1B, for example. Data can be collected using the data collection apparatuses 52. As stated above, the data collection apparatuses 52 can be a wide range of devices such as cameras, sensors, mobile apparatuses with sensing and/or image capturing devices, computers where data can be downloaded or entered, or the like. The data that is collected can come from a variety of different sources and be in different forms as stated above. This data can be downloaded or entered into a data processor 54. In the embodiment shown in FIG. 2C, the data collection apparatuses 52 can send the collected data over a network 56 to the data processor 54. Such a network 56 can be wireless or can be a wired. Alternatively, the information collected by the data collection apparatuses 52 can be downloaded in a drive of the data processor 54. The data processor 54 which can be, for example, a personal computer, can used to edit, organize, and analyze the data received.

The data can be used to create the most accurate depiction or replicate of the one or more structures and/or the area layout for the location of the mission site for the mission for which the training is occurring. The data processor can then be used to generate accurate textural imagery and visual imagery of the structure to be simulated based on the analysis of the data. The accurate depictions of the structure to be simulated and the accuracy of the textural and visual imagery created are based on a redundancy of data found in the data collected and analyzed. This means that from all the different sources of information provided to the data processor in different measurement forms when a measurement result keep reoccurring in different forms, then the measurement is figured to be more accurate. Show measurement result can possibly be heavily relied on to create an accurate depiction and accurate textural imagery and visual imagery.

For each structure, the data can be analyzed and manipulated to create a more accurate image for each side of a structure to be replicated. For example, an image of a front of a building can be manipulated to permit the image to be divided into sections and fit to a size for printing onto a wrapping material on a large-format printer 58. The image can also be manipulated to better fit the underlying physical construct of the structure being covered. Once the images to be printed are determined, they can be sent to the printer 58 to be printed. For example, the data processor 54 can be linked to the printer directly or via a wireless or wired network. Alternatively, the image or images can be stored on a portable drive that can be inserted into the printer 58 to download the image for printing.

Once the images to be printed are determined, the texture or shape of the structure to be replicated or simulated can be analyzed. Thus, the texture or shape of the textured wall segment or textured wall segments on which the wrapping material with the printed image will be applied can be determined or selected in 60. The texture or shape of the textured wall segments should generally correspond to the image to be printed on the sheets of wrapping material. For example, with an image of a stone wall, the shape of the stones in the textured wall segments being molded should generally be aligned with the image of corresponding stones in the image.

To create a textured wall segment, a mold can be used. In some cases existing molds may be close enough in texture and/or shape to be used to create the textured wall segment to underlie the image. In other instances, new molds may be required to be made. The data that has been edited, organized and analyzed through the aid of the data processor 54 can be used to determine whether an existing mold can be used r a new mold needs to be made. If a new mold needs to be made, the detailed information regarding the mold can be sent to or delivered to the appropriate locations for production of the mold. A mold of the predominant textures can be made using a rubber and or silicone mold form. Once appropriate molds are made and selected in 60, the textured wall segments can be formed in the molds. Similarly, the images that have been determined to be used can be sent to and printed on the printer 58. The textured wall segment molding process and the printing process are described in more detail below.

Figure 3A:
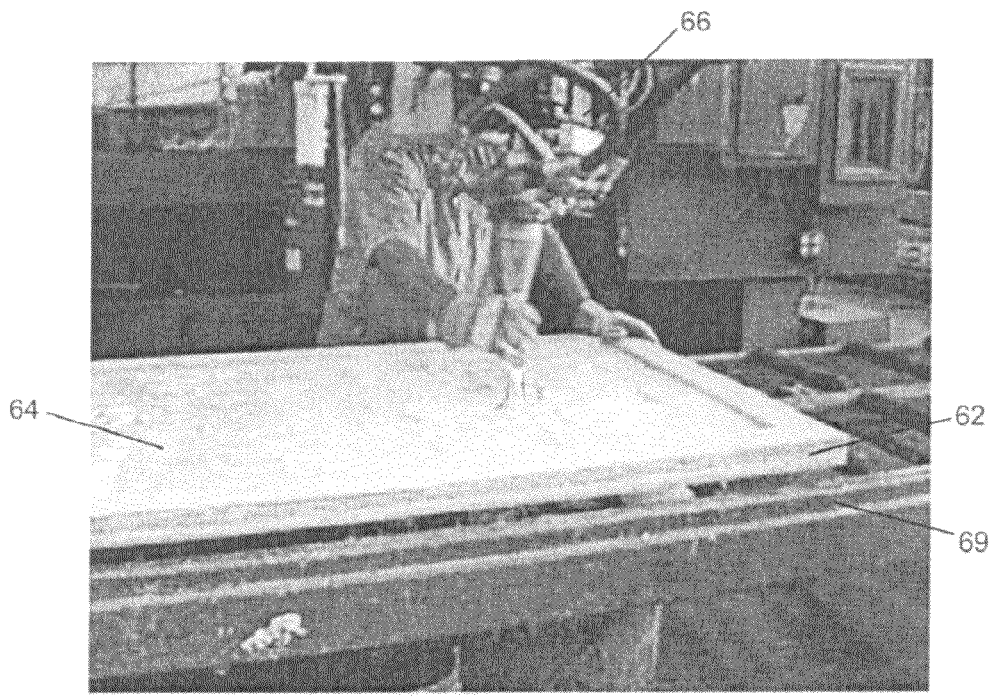
FIGS. 3A-3B illustrate possible steps for creating embodiments of a wall segments according to the present subject matter.
Figure 3B:
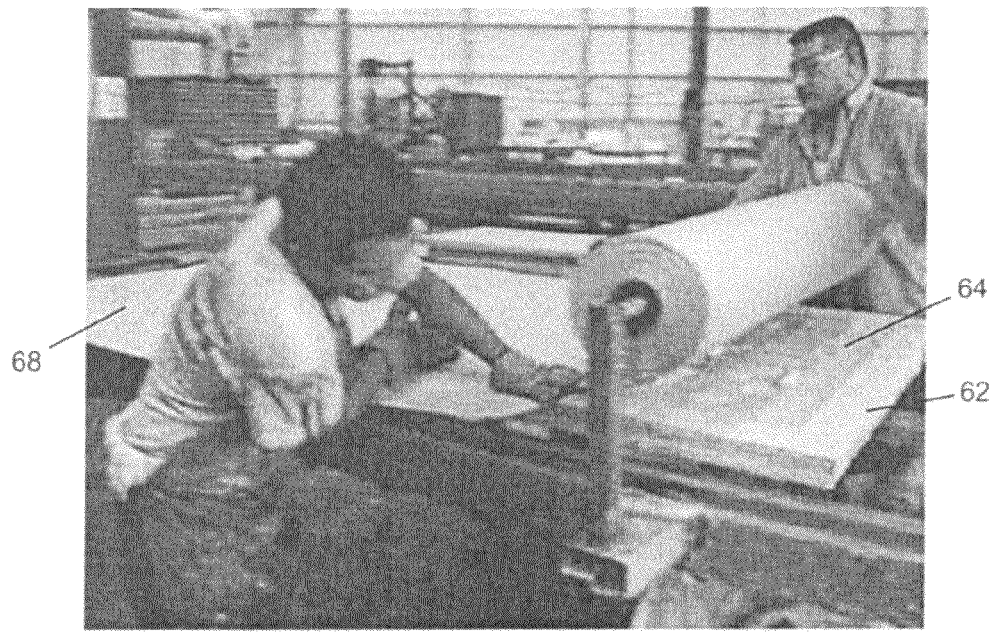

Referring to FIGS. 3A-4D, different steps in the textured wall segment molding process for two different sized textured wall segments are illustrated. As shown in FIGS. 3A and 3B, a large textured wall segment mold 62 can be filled with a polymer, or polymer foam, 64 to create a textured wall segment. The large textured wall segments can be different sizes depending on the size of the structure to be covered. For example, the large textured wall segments can be about 4 feet by about 8 feet. A dispenser 66, which dispenses polymer 64 into the mold 62, can be moved along the mold to disperse the polymer 64 evenly within the mold 62. Alternatively or additionally, the mold 62 can be moved along a path, for example, by a conveyor 69 to facilitate the dispersing of the polymer 64 into the mold 62. As shown in FIG. 3A, a protective sheet 68 can be placed over the mold 62 filled with polymer 64 to prevent contaminates or other foreign particles from falling into the polymer before or during the curing process. The mold 62 with the polymer 64 therein can then be cured (not shown) in a curing process under high pressure. For example, the molds can be placed under a pressure of about 30,000 lbs. for a specified length of time to cause the polymer to harden.

The polymer 64 can be, for example, a high density polyurethane which can also be in a resin or liquid form. In the case of polyurethane, the molds 64 are placed inside presses that exert pressure while constraining the expansion which produces a textured wall segment with greater surface strength than it would otherwise. This greater surface strength is useful for the specific demands of realistic urban training facilities. These demands include quick convertibility for multiple or differing training environments and hardiness to withstand range use (including force on force simunitions and battle-effects). To complete this stage, a base coat can be applied to the polyurethane textured wall segment after it is released from the mold to later ensure proper adhesion or easier application of the digital photograph or detailed image.

Figure 4A:
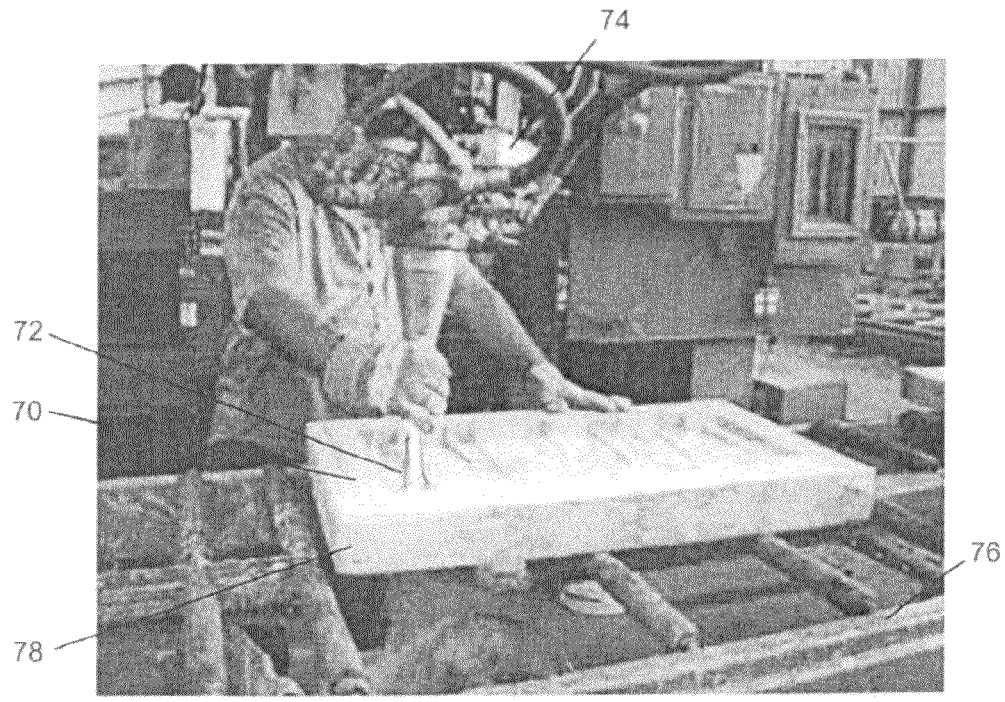
FIGS. 4A-4D illustrate possible steps for creating embodiments of a wall segments according to the present subject matter.

FIGS. 4A-4D illustrates the some of the steps that can be used in making textured wall segments as well. As shown, the textured wall segments being made in FIGS. 4A-4D are smaller that the textured wall segments in FIGS. 3A and 3B. For example, these textured wall segments can be used for replicating smaller structures, or for replicating structures that have a variety of textures over short spans. Alternatively, these smaller textured wall segments can be for use in repairing larger textured wall segments or replacement of portions of larger textured wall segments in a replicated structure. As shown in FIG. 4A, an inner mold 70 can be filled with a polymer, or polymer foam, 72 to create a textured wall segment. As with the large textured wall segments, small textured wall segments can be different sizes depending on the size of the structure to be covered. A dispenser 74, which dispenses polymer 72 into the inner mold 70, can be moved along the mold 70 to disperse the polymer 72 evenly within the mold 70. Alternatively or additionally, the mold 70 can be moved along a path, for example, by a conveyor 76 to facilitate the dispersing of the polymer 72 into the mold 70.

The inner mold 70 can be placed in an outer mold 78. The inner mold 70 can flexible, while the outer mold 78 can be generally rigid and strong. With the polymer 64 in within the inner mold 70, which, in turn, resides in the outer mold 78, the polymer 72 can then be cured (not shown) in an oven at appropriate temperatures to cause the polymer 72 to harden. The combination of the inner flexible mold 70 and the outer rigid mold 78 permits the curing to occur under higher pressure. This high pressure can lead to less expansion of the polymer 72 being cured. Additionally, the cured polymer will likely contain less air and can be denser than it would have otherwise been.

Figure 4B:
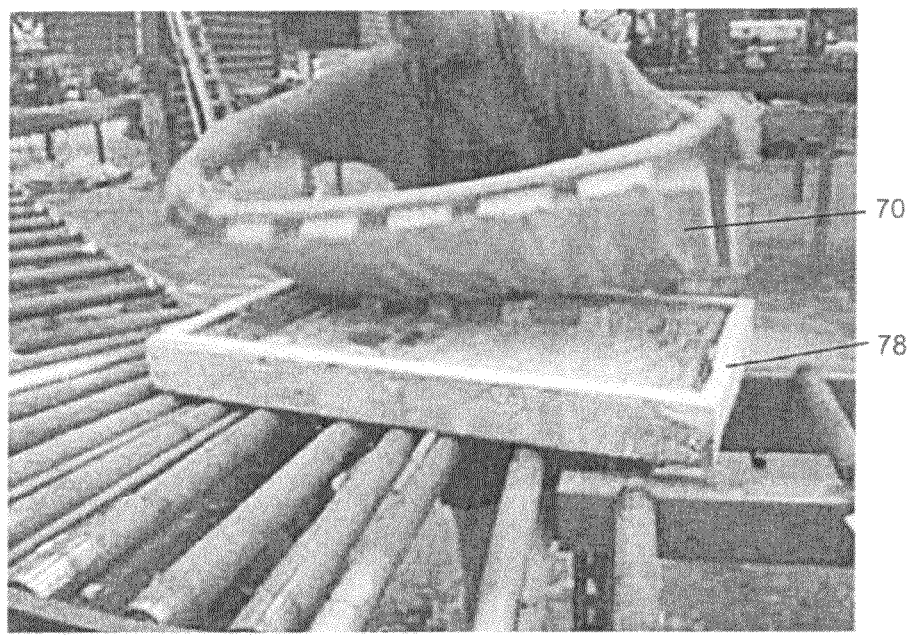
Figure 4C:
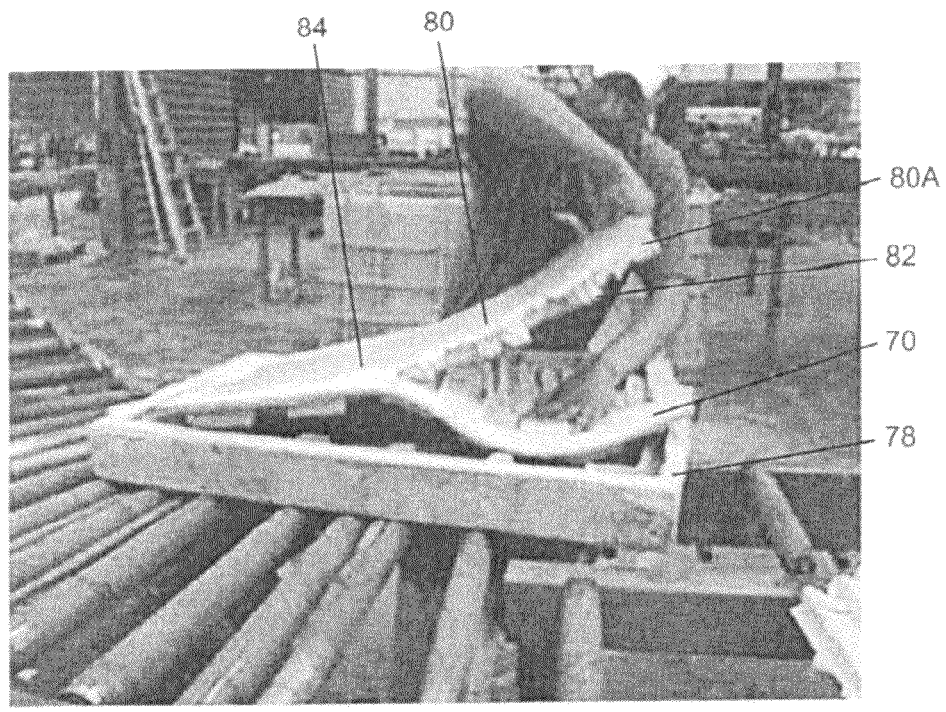
Figure 4D:
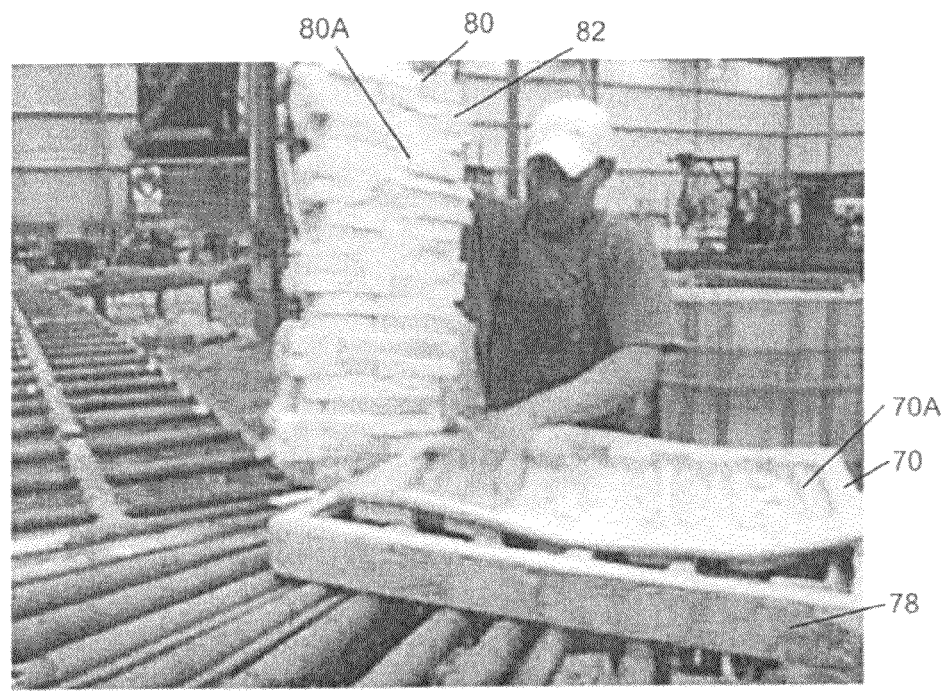

After curing occurs, the inner mold 70 can be removed from the outer mold 78 as shown in FIG. 4B. A textured wall segment 80 of the cured polymer can then be removed from the flexible inner mold 70. Depending on the polymer used, the textured wall segment can be rigid or can be more flexible. The use of polyurethane as the polymer that is cured under pressure can result in a rigid textured wall segment that can generally resist bending under its own weight. As can be seen in FIG. 4D, the inner mold 70 can have different levels of indentions 70A that create the texture 80A on a front face (or side) 82 of the textured wall segment 80. As shown in the embodiment illustrated in FIGS. 4A-4D, a one-sided mold can be used to create a flat backside surface 84. Alternatively, a two-sided old can be used.

Figure 5A:
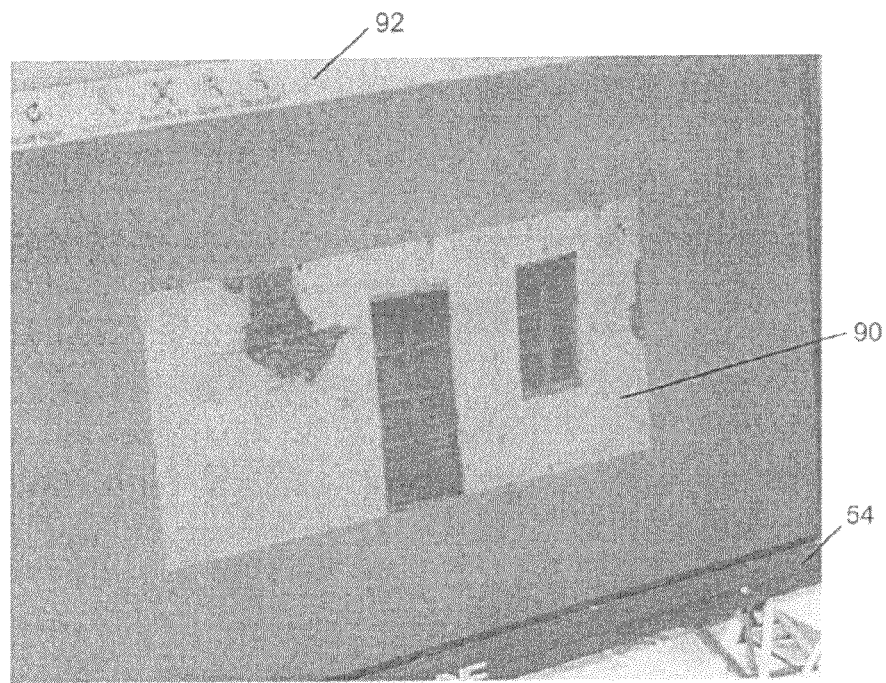
FIGS. 5A-5D illustrate possible steps for creating embodiments of wrapping material panels according to the present subject matter.

As shown in FIG. 5A, the one or more images 90 to be printed can be create, edited, and/or manipulated to obtain the appropriate visual architectural characteristics for the structures 10 in FIGS. 1A and 1B. The one or more images 90 can be edited and/or manipulated to incorporate the analyzed data that has been collected as shown in FIG. 2D. Suitable high megapixel images can be used if available and/or the intelligence derived in planning the mission site and/or the mission scenario can dictate the photographic images to be used.

For example, the photographic image 90, which can be digital, can be opened on the data processor 54 in the form on a computer in an image-editing program 92 as shown in FIG. 5A so that the digital photographic image 90 can be enhanced and manipulated to create an image that can be printed on panels of the wrapping material used to cover the textured wall segments described above to create appropriate visual architectural characteristics on the structure. The image-editing program can be, for example, PHOTOSHOP® offered by Adobe Systems Incorporated, San Jose Calif. Other image-editing programs can include equivalent photo manipulation and editing software programs such as PAINT-.NET® and PICASA®, or the like, or in the case of video footage the image-editing programs can include appropriate video editing software programs that will produce a digital still frame photographic image. Through concepts like vanishing point perspective, a situational realism can be accurately re-created by editing, enhancing, and manipulating the one or more images 90 as needed to reflect appropriate and realistic visual characteristics once printed on the wrapping material that serves as a substrate and applied to a textured wall segment.

Once the desired image is confirmed, a proof can be printed to check and see if the appropriate color, clarity, and depth are still being achieved and the image is still an ideal match for the operating environment and the structure 10 shown in FIGS. 1A and 1B.

Next, using the image-editing program, the image can be divided into the sections called panels hereinabove. After printing, these panels can fit together overlapping one another when placed on the structure. No registry lines are necessary. The overlapping of the panels can improve seal, adhesion, and installation procedures. The sizes of the panels can depend on the size of the structure to be covered and are only constrained by the cost effectiveness of the selected size, manageability of the installation process, and the printer capabilities. For example, the panels can range from a few square inches to lengths and widths of 100 inches or more.

Once the design is divided into corresponding panels using the image-editing program, the image panels can be printed to a wrapping material substrate. If color, clarity, and depth in the image are achieved, then the panel sections can be saved and sent to a printer 100 (see FIGS. 2D and 5B) to begin the "rip" process of transferring the panel images to the printer and the printer's software. Before the rip process is to begin, another proof can be printed to make sure that nothing has moved or been dropped from the file, if deemed necessary. Once this proof is checked, a test print process of printing an actual panel or a portion of an actual panel on wrapping material can be done, if deemed necessary, to make sure the colors match between the image on the screen of the computer and the image printed on the wrapping material.

Figure 5B:
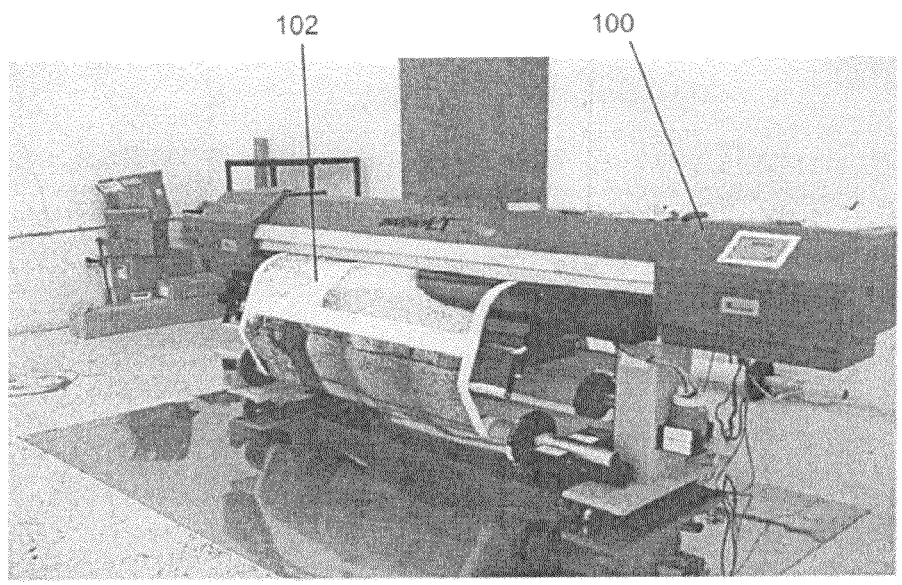

If there is a match or if the check steps are skipped, the printer 100 as shown in FIG. 5B is used to print the necessary panels 102 of wrapping material. The panels 102 of wrapping material can be, for example, a large format graphics medium such as adhesive vinyl graphic film. The printer 100 can be large format printing technology such as large format inkjet printers.

Different sized panels can be used. The number and size of the panels may vary based on the criteria outlined above. In particular, the sizes of the panels can depend on the size and shape of the structure to be covered and are only constrained by the cost effectiveness of the selected size, manageability of the installation process, and the printer capabilities. The size and shape of the wrapping material panels can correspond to the size and shape of the textured wall segments. In such a manner, the textured wall segments can be installed on a structure after the wrapping material panels are applied thereto. In this manner, the textured wall segments are easily reusable. In such embodiments, the edges of the textured wall segments would need to match without an overlay of wrapping material panels. The selected sizes can assist with the installation process.

Alternatively, the size and shape of the wrapping material panels can be different from the size and shape of the textured wall segments. In such a manner, the textured wall segments can be installed on a structure before the wrapping material panels are applied to the textured wall segments. In such embodiments, the wrapping material can overlay edges or joints between the textured wall segments to conceal such edges and joints. Also, the wrapping material panels can overlay each other to ensure that they match. The selected sizes can help with manageability and control of the product for the installation crews during the installation process. The selected sizes can promote versatility as some of the installations are done outdoors and some are done indoors. Wind and the elements are also a factor in the installation process.

Figure 5C:
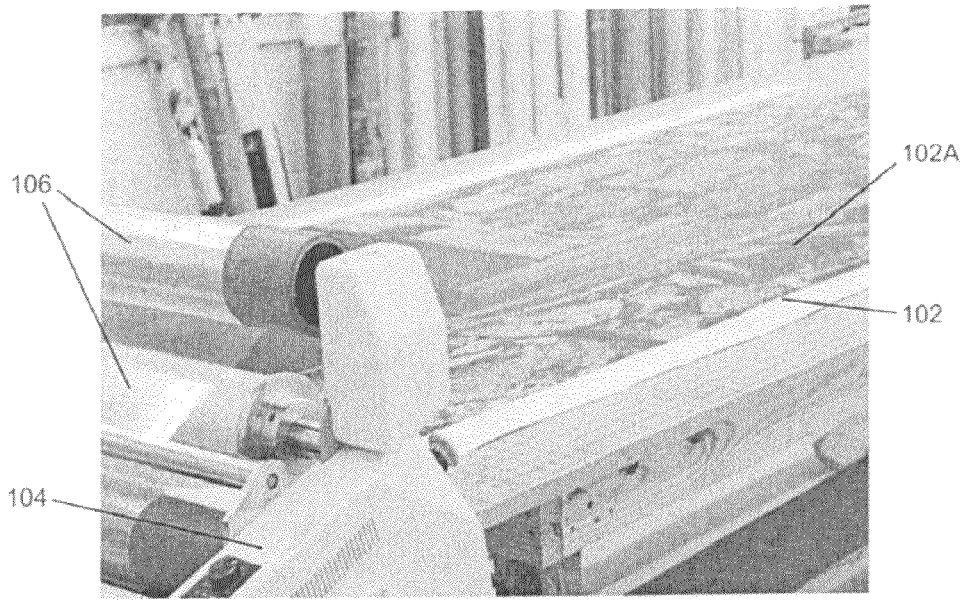

After the photographic image is printed on the wrapping material panel 102, the wrapping material panel 102 can be run through a laminator 104 can apply a laminate layer 106 over the printed surface 102A to protect the printed image and to add other desirable characteristics to the wrapping material panel 102 as shown in FIG. 5C. For example, a protective clear matte over-laminate 106 can be applied to the printed wrapping material panel 102 with the laminator 104 by aligning the laminate layer 106 with the printed wrapping material panel 102 so that the laminate layer 106 overlays the printed surface 102A of the wrapping material panel 102 and applying heat and pressure to the overlaid laminate layer 106 and wrapping panel 102 for protection from elements and to protect the underlying printed image. For example, the wrapping material panel 102 and the laminate layer 106 with the laminate layer 106 aligned with and overlaying the printed surface 102A of the wrapping material panel 102 can be guided through heated and pressurized nip rollers within the laminator 104 to fuse the laminate layer 106 to the wrapping material panel 102.

The wrapping material panel 102 described above can be a thermoplastic film. For example, the wrapping material panel 102 can be a vinyl film such as a polyvinyl chloride film. The type of material and characteristics of the wrapping material panel 102 used can depend on the end use of the textured wall segments that are to be wrapped and the type of structure to which it is applied and the operating environment in which it will be used.

One example of the laminating process is explained in more detail below. Suitable wrapping material can have a protective overcoating laminate layer, like layer 106 described above, laminated thereto that can provide excellent durability and permit quick modification and/or changeability to change the appearance of the structure to which the wrapping material is attached. The durability allows the wrapping material to continue to function in creating visual and situational realism for an extended period of time and under sever weather conditions. The ability to quickly change or modify the appearance of a structure by removal and/or application of the wrapping material is beneficial for modern operational urban training. It permits the same structures to be used to create visually realistic urban settings from different areas or regions of the world in a quick and simple manner.

An example of a thermoplastic film that can be used is a polyvinyl chloride ("PVC") film. The film can be run through a printer to print the portion of the photographic image on the PVC film. For such a film, the conditions in the printing area are preferably controlled. For example, the room temperature and relative humidity can be between about 60° F. to about 90° F. and the relative humidity can be between about 50% to about 90% RH. For instance, the temperature and relative humidity can be about 73° F. (23° C.) and 50% RH when using as a wrapping material a 2.7 mil gloss white, polymeric stabilized, soft calendared PVC film designed for receiving digital ink jet printing. The ink used can be printing inks such as digital printing inks. Different inks can be used to ascertain different properties in the final product. The wrapping material used can be coated on one side with a permanent, opaque, acrylic, pressure sensitive adhesive with air egress technology and supplied with a 80# poly coated liner that is used as a release liner to protect the adhesive until time for application. Below is a list of physical properties of an example acrylic adhesive that can be applied to a substrate such as the PVC film described above.

TABLE 1

Properties of an Example Pressure Adhesive

| Physical Properties | Typical Values | Test Method (Federal Test Methods used) |
|---|---|---|
| Peel Adhesion, lb./in. (N/25 mm) 180 degrees on glass - 24 hr | about 3.2-about 4.6 (about 14-20) | FTM - 1 |
| Quick Tack on Glass lb./in. (N/25 mm) | about 3.4-about 4.8 (about 15-about 21) | FTM - 9 |
| Dimensional Stability, (%) 10" by 10" sample bonded to Aluminum | Maximum of about 0.5 | FTM - 14 |
| Normal Application Temperature and Temperature Ranges for Minimum Application | Above about 50° F. (about +10° C.) About −40° F. to about 194° F. (about −40° C. to about 90° C.) | |

Once the material is printed, it can be laid on a drying table and left to "gas" or "dry" for a period of about 72 hours to ensure that the ink is dry, if necessary. Once the material has gone through this drying period and depending on the end use of the wrapping material and the structure to which it is to be applied, it can then be laminated in a lamination process to provide an overcoating laminate layer, like layer 106. Laminating a wrapping material like PVC film can add strength and protection to the printed image. For example, a laminate when bonded with the PVC film can provide protection to the image by minimizing the ability to scratch or remove the image from the wrapping material. The laminated wrapping material can also provide protection to a structure on which it is applied. The laminate can also be used to add gloss or a reflection control layer.

The material used in such a lamination process can be a highly conformable cast film, such as a PVC film, that can range in thickness from about 0.5 mm to about 10 mm. For example, highly conformable cast film having a thickness of about 1.5 mm can be used. A cast vinyl laminate can have a built-in ultraviolet protection, be optically clear, and have a low gloss or no-gloss (flat) finish or matte. The laminate can include a permanent adhesive, such as an acrylic adhesive.

The printed wrapping material and the laminate can be run through a lamination process where the adhesive side of the laminate faces the printed side of the wrapping material. The laminate and wrapping material can then pass through pressurized heated or unheated rollers to secure the laminate to the wrapping material. The laminate can be usable in temperatures from about 50° F. to about 225° F. Thus, the laminate can be applied to the wrapping material in hot and cold applications. In the PVC film example, the wrapping material can be left to cool after the material is laminated at about 120° F.

In another example, a 1.5-mil clear matte or a 1.5-mil clear gloss, which are highly conformable cast PVC films, can be chosen as the laminate. The over-laminate film is coated on one side with a clear permanent, acrylic pressure sensitive adhesive and supplied with a 1.2 mil polyester release liner. Upon application, the release liner can be removed. The printed wrapping material and the laminate can be aligned so that the adhesive side of the laminate faces the printed side of the wrapping material. The laminate and wrapping material can then pass through pressurized rollers to secure the laminate to the wrapping material. UV protection can be incorporated into the over-laminating film to help extend the life of the graphic by resisting color fade caused by ultraviolet light.

Once the wrapping material has been created with the image printed thereon, the wrapping material can be applied to a surface on the base structure to be covered. A wrapping material, such as the PVC film described above with its adhesive backing, can be attached to wood, brick, plaster, drywall, stone, steel, rubber, cardboard, particle board, chloroplast or the like where the temperature range and adhesion characteristics are favorable.

Figure 5D:
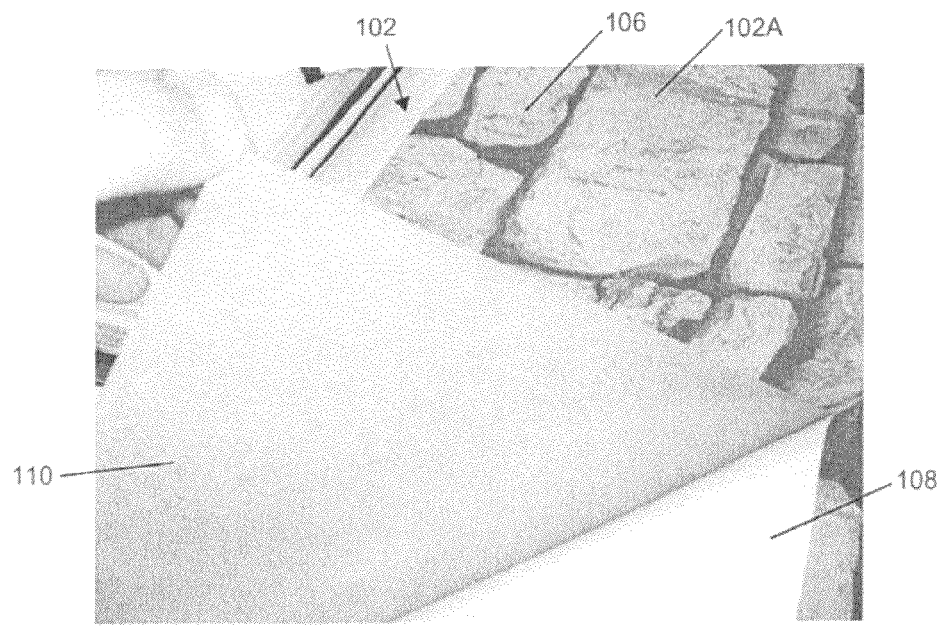

Thus, as shown in FIG. 5D, each wrapping material panel 102 with the printed surface 102A thereon and protected by laminate layer 106 can have a release liner 108 that protects the back surface 102B of the wrapping material panel 102 on which an adhesive can reside. The release liners 108 can be separated from the wrapping material panel 102 to expose the back surface 102B and the adhesive thereon.

Thus, a simulated structure for urban operations training based on a structure to be simulated can be created by collecting data specific to a structure to be simulated as described above and analyzing the data to create an accurate depiction of the structure to be simulated. Based on the analysis, an accurate textural imagery and accurate visual imagery of the structure to be simulated based can be generated. One or more wall segments can then be created that have a textured outer surface based on the generated textural imagery that reflects the texture of an outer surface of the structure to be simulated. Similarly, the generated visual imagery can then be printed on one or more wrapping material panels as described above. At this point as will be described below in detail, the one or more wall segments and one or more wrapping material panels can be secured to a base structure to create a simulated structure that has realistic visual characteristics representative of the structure to be simulated.

Figure 6:
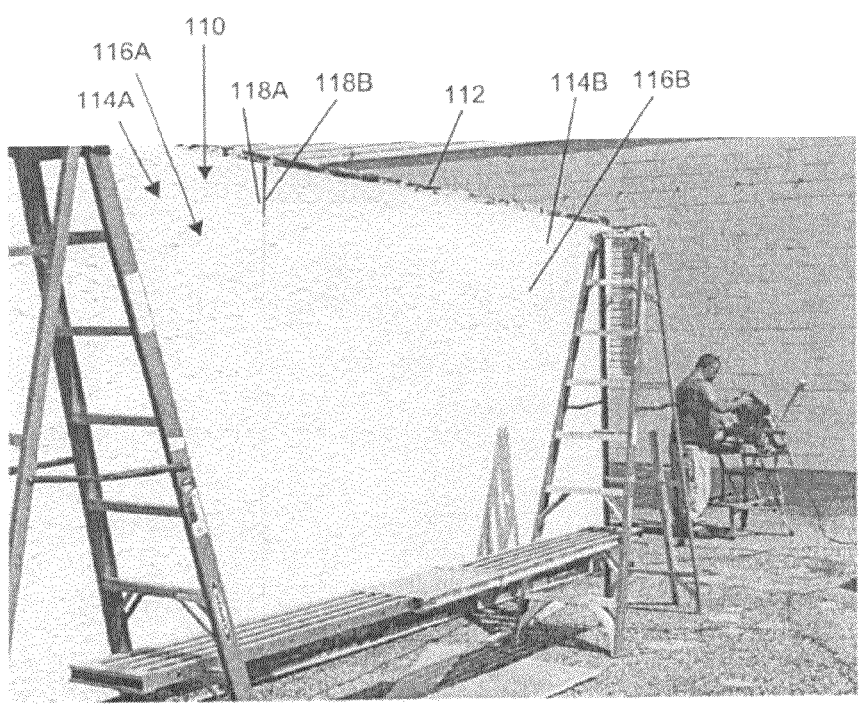
FIG. 6 illustrates a perspective view of an embodiment of a base structure with wall segments being secured thereon according to the present subject matter.

Once the data has been gathered and processed for recreating or replicating a mission site or mission environment and the appropriate imagery created and printed on the wrapping material panels and the corresponding textured wall segments created, one or more simulated structures can be created with realistic looking facades that correspond to structures to be simulated for modern urban operations training facilities. Some example embodiments of processes for creating such structures that simulate structures at a mission site or that are representative of a mission site or a mission scenario are illustrated in FIGS. 6-12F. FIG. 6 illustrates a structure 110 that can be converted into a simulated structure of an original structure at a mission site. The structure 110 can be a permanent build structure, a mobile structure, or a structure comprising modular units. In the embodiment shown in FIG. 6, the structure 110 is a conex container. The structure 110 can have multiple walls, a floor and ceiling.

To create an simulated structure, one or more textured wall segments 114A, 114B that have been created can be secured to one or more walls 112 of the structure 110. As shown in FIG. 6, two textured wall segments 114A, 114B can be attached to a wall of the structure 110. The textured wall segments 114A, 114B can be attached in different manners. For example, the textured wall segments 114A, 114B can be attached to the wall 112 of structure 110 by screws, nuts and bolts, adhesive, bonding, or the like.

The textured wall segments 114A, 114B can have a textured outer surface 116A, 116B, respectively. As described above, the textured wall segment 114A with its textured outer surface 116A and textured wall segment 114B with its textured outer surface 116B can be selected or determined based on the imagery that will be printed on the wrapping panels that will be applied. For example, the textured outer surface 116A, 116B of the textured wall segments 114A, 114B can generally correspond or make the appearance of generally corresponding to the structure or texture depicted in the image printed on the wrapping material panels. In this manner, the textured wall segments 114A, 114B create the underlying relief for the image on the wrapping material panel to be attached. The textured wall segments 114A, 114B can extend the height of the wall 112 to completely cover the wall 112. If the wall 112 has a feature such as a door or window, then the textured wall segments 114A, 114B that cover the surrounding area can contain an open area for such feature. When attached, an inner edge 116A of the textured wall segment 114A can abut an inner edge 116B of the textured wall segment 114B, so that the wall 112 is generally covered.

Figure 7A:
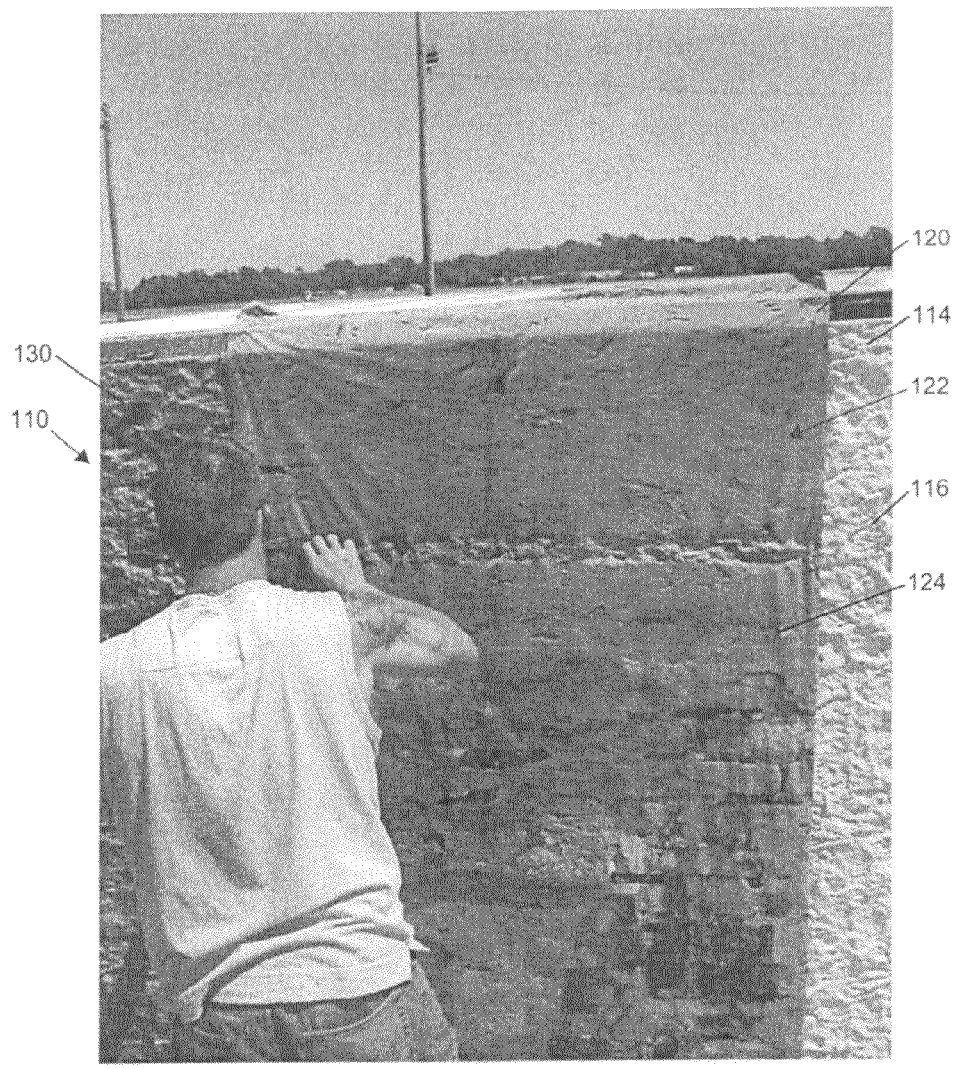
FIGS. 7A-7D illustrate steps in applying wrapping material panels to embodiments of wall segments in creating an embodiment of a simulated structure according to the present subject matter.

In such an embodiment, once the textured wall segments 114A, 114B are properly secured to the walls 112 of the structure 110, wrapping material panels can be applied to the textured outer surfaces 116A, 116B of the textured wall segments 114A, 114B. As shown in FIG. 7A, a wrapping material panel 120 with an image 122 on an outer surface 124 can be properly sized and positioned on the textured outer surface 116 of the textured wall segment 114 on which it will be secured. The image 122 on the outer surface 124 can be aligned with a wrapping material panel 130 that has already be aligned with and secured to textured outer surface 116 of the textured wall segment 114. In particular, the image 122 on the outer surface 124 of wrapping material panel 120 can be properly aligned with an image 132 on an outer surface 134 of the wrapping material panel 130 to create a generally seamless image over the textured wall segments 114. Additionally, the image 122 on the outer surface 124 of wrapping material panel 120 can be properly aligned with the reliefs in the textured outer surface 116 of the textured wall segment 114 as needed.

Once the proper position is determined, the wrapping material panel 120 can be draped over textured outer surface 116 of the textured wall segment 114. If the wrapping material panel 120 has an adhesive covered back surface 109 (See FIG. 5D), the release liner 108 (see FIG. 5D) can be removed and the panel 120 can be applied to the textured outer surface 116 of the textured wall segment 114 with the adhesive covered back surface 109 (see FIG. 5D) of the panel 120 being pressed against the textured outer surface 116 of the textured wall segment 114.

Figure 7B:
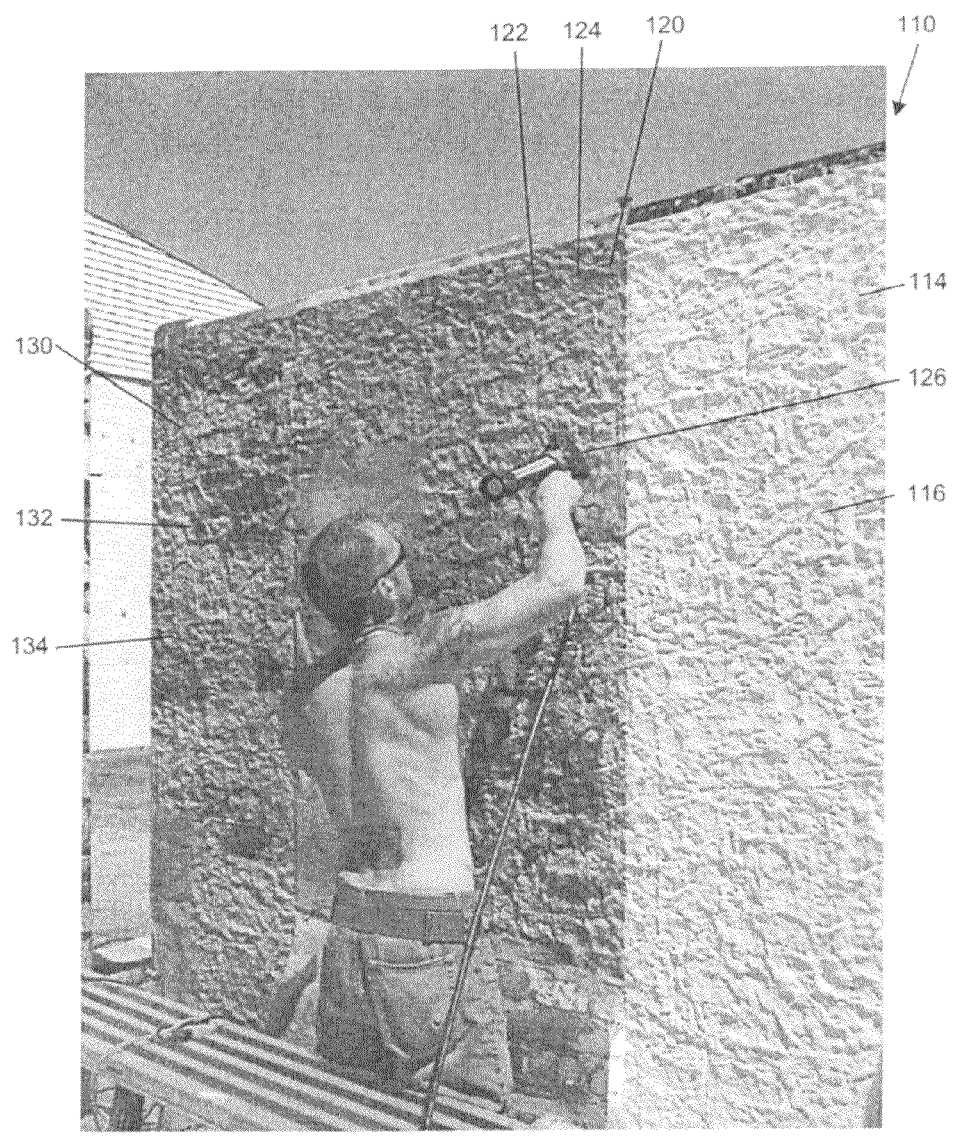
Figure 7C:
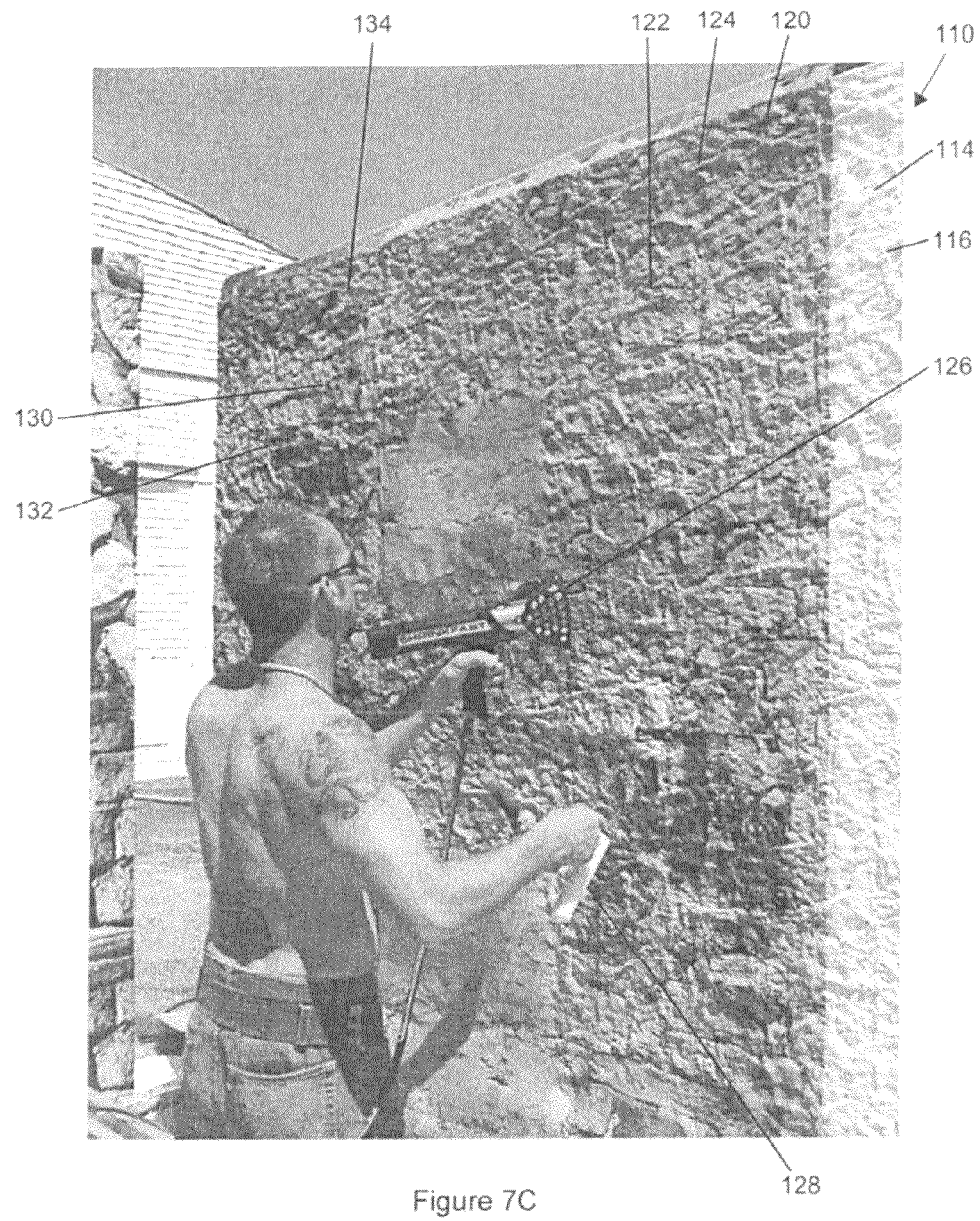
Figure 7D:
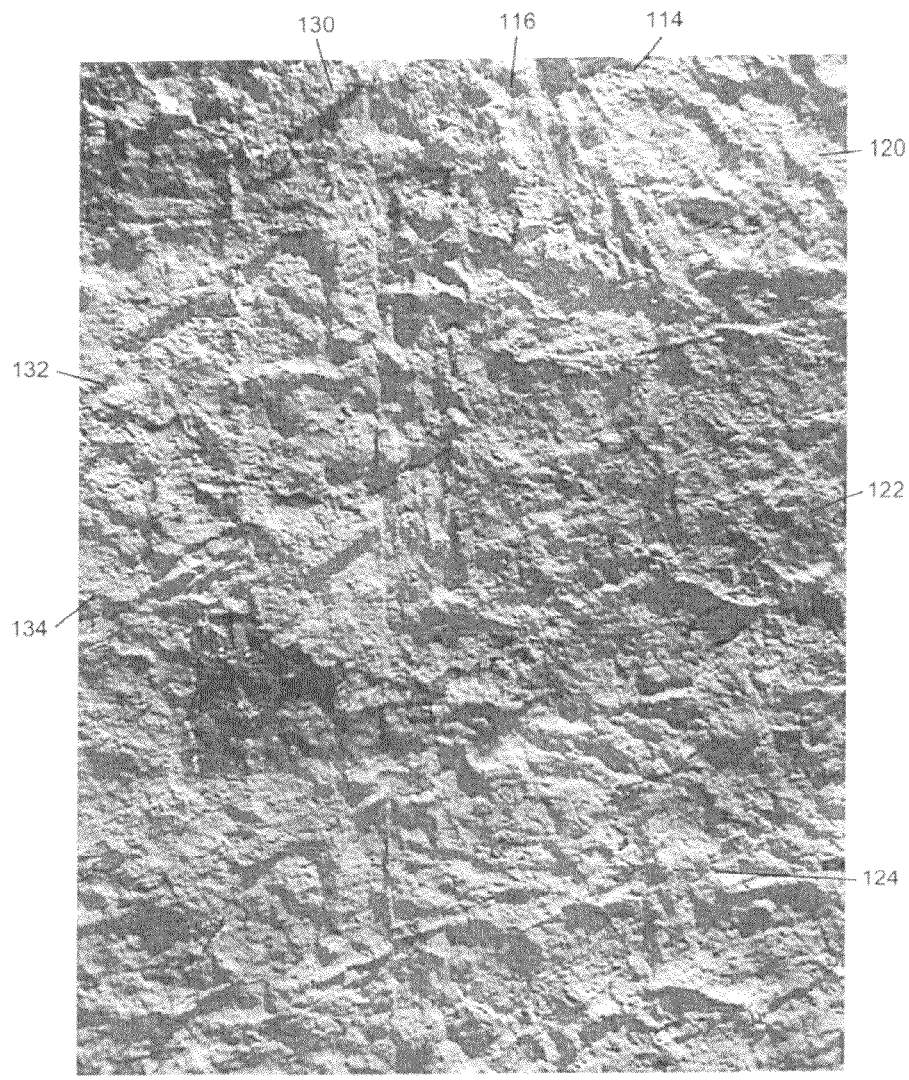

Depending on the wrapping material and/or adhesive used, the panels 120 can be applied using heat and/or pressure to adhere it to textured outer surface 116 of the textured wall segment 114. For example, as shown in FIGS. 7B and 7C, a heating device 126, such as a heat gun, and a roller device 128 can be ensure adequate or increased securement of wrapping material panel 120 to the textured outer surface 116 of the textured wall segment 114. The heat from the heating device can soften the wrapping material panel 120 to increase its malleability. The roller device 128 can have enough "give" to allow the vinyl to be applied into crevices and indentions in the textured outer surface 116 of the textured wall segment 114. As seen in FIGS. 7B, 7C, and 7E, after securement of wrapping material panel 120 to the textured outer surface 116 of the textured wall segment 114, the image 122 on the outer surface 124 of wrapping material panel 120 and the image 132 on the outer surface 134 of the wrapping material panel 130 creates a generally seamless image over the textured wall segments 114.

Figure 8:
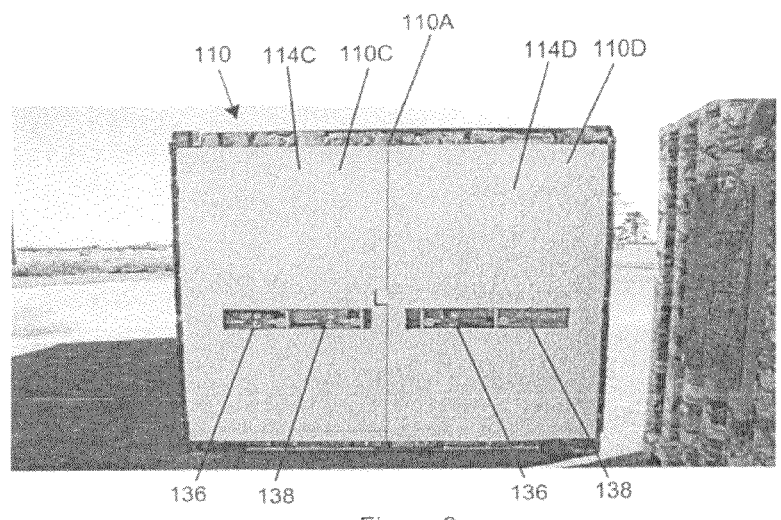
FIG. 8 illustrates a perspective view of a base structure with embodiments of wall segments secured thereon according to the present subject matter.

If needed, cut-outs in the textured wall segments 114 can be employed for necessary functionality of the structure 110, or as a means for quickly repairing a section of the textured wall segments 114 should it become damaged. As shown in FIG. 8, a rear portion 110A of a structure 110 can include doors 110C, 110D with locking handles 136. Textured wall segment 114C can be secured to door 110C and textured wall segment 114D can be secured to door 110D, cut-outs 138 can be provided in the textured wall segments 114C, 114D to provide access to locking handles 136. The portions cut out from the textured wall segments 114C, 114D can be saved for reinsertion to provide coverage while also providing easy access. The cut outs can be removed before or after application of a wrapping material panel. In this manner, the doors 110C, 110D can act as a wall during training exercises while still providing access to the interior of the structure 110.

Figure 9A:
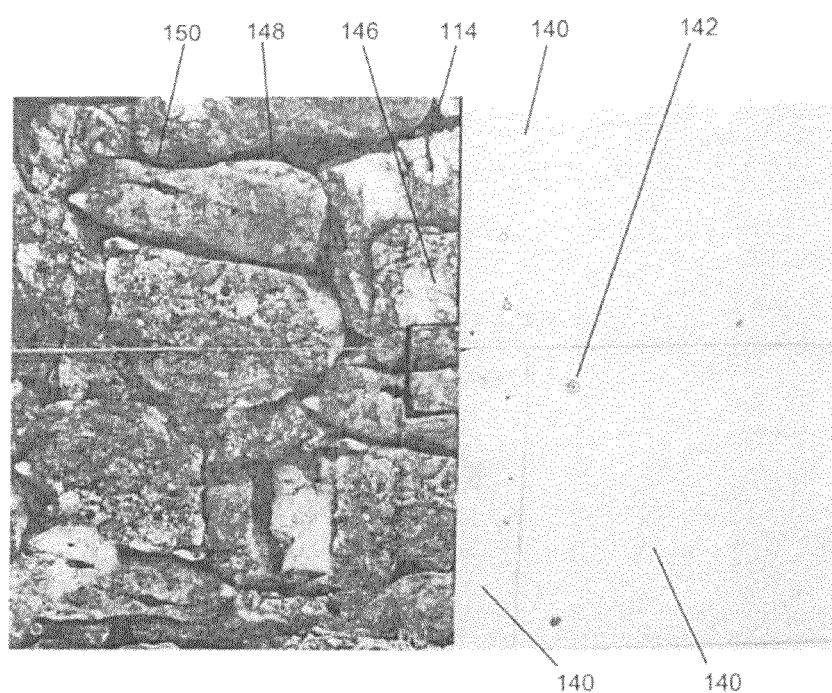
FIGS. 9A and 9B illustrate steps in repairs of simulated structures according to the present subject matter.
Figure 9B:
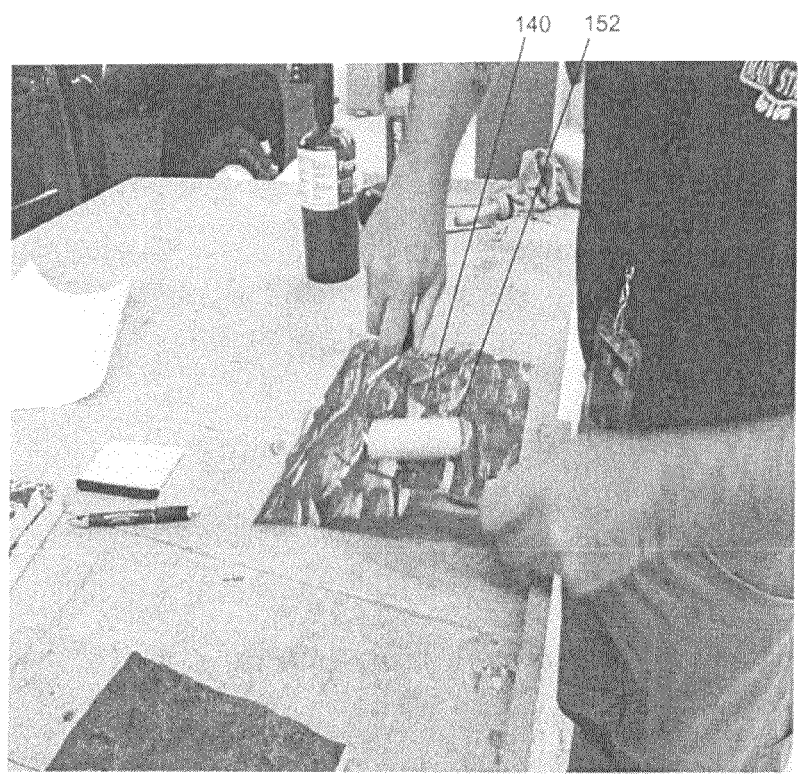

Similarly, while a polymer like high density polyurethane can be use to create the textured wall segments that can better withstand the rigors of modern urban operations training, as the structure 110 is used, damage to the textured wall segments 114 can likely occur. Cut-outs in the textured wall segments 114 can thus be employed as a means for quickly repairing a section of the textured wall segments 114 should it become damaged. FIGS. 9A and 9B illustrates where cut-outs can be used to repair portions of the textured wall segment 114. After damage occurs to a textured wall segment 114, the damaged portion can be at least partially removed and one or more newly molded subsections 140 that match the features the original portion removed can be secured, for example, by screws to the textured wall segment 114. A smaller printed wrapping material panel can be applied to the one or more newly molded subsections 140 that matches and aligns with an image 146 on an outer surface 148 of the original wrapping material panels 150. Alternatively, as shown in FIG. 9B, a smaller printed wrapping material panel 152 can be applied to a newly molded subsection 140 before installation upon ensuring proper alignment with the existing image on the texture wall segment being repaired.

Figure 10A:
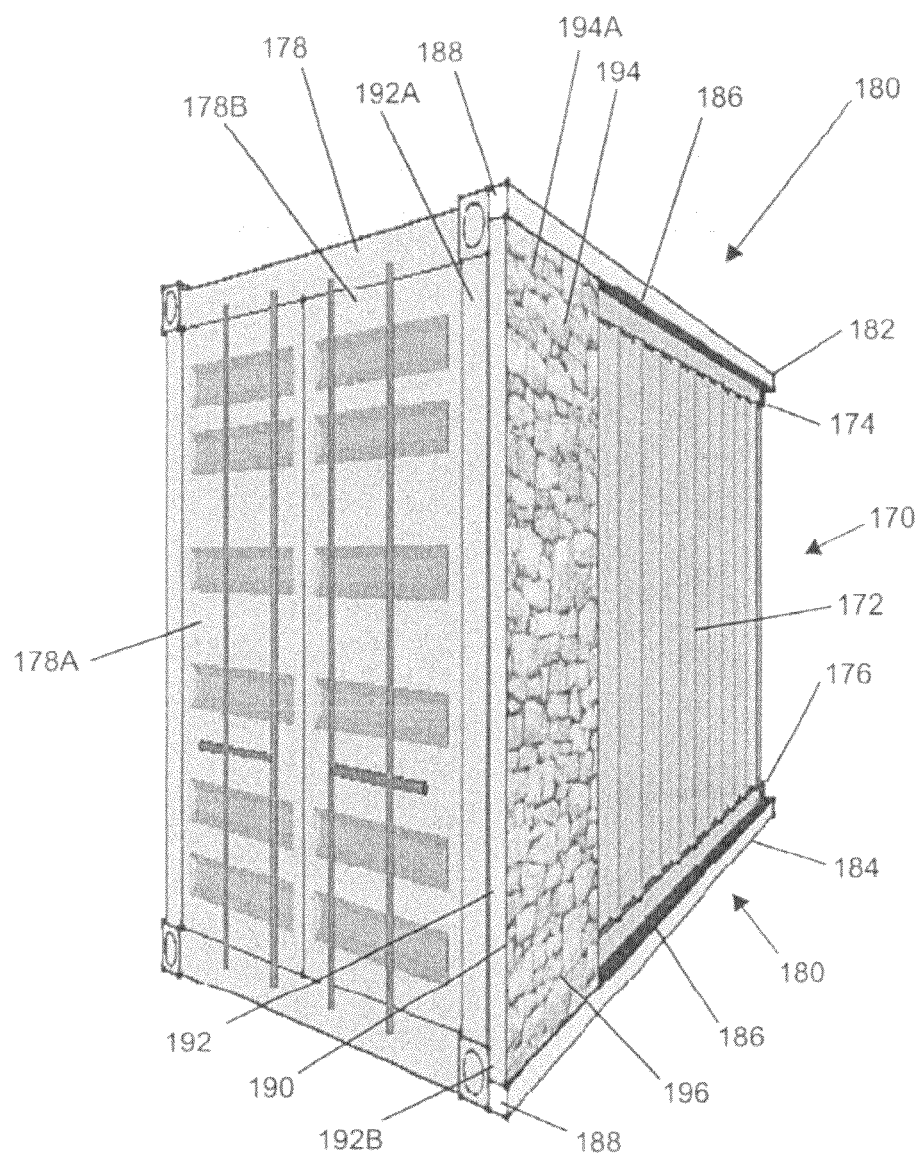
FIGS. 10A-10C illustrate perspective views of embodiments of components that can be used to replicate a structure to be simulated according to the present subject matter.
Figure 10B:
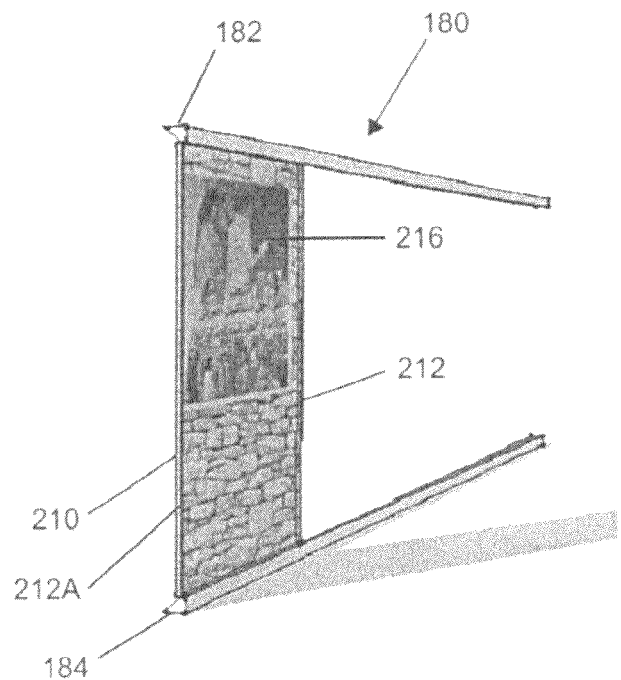
Figure 10C:
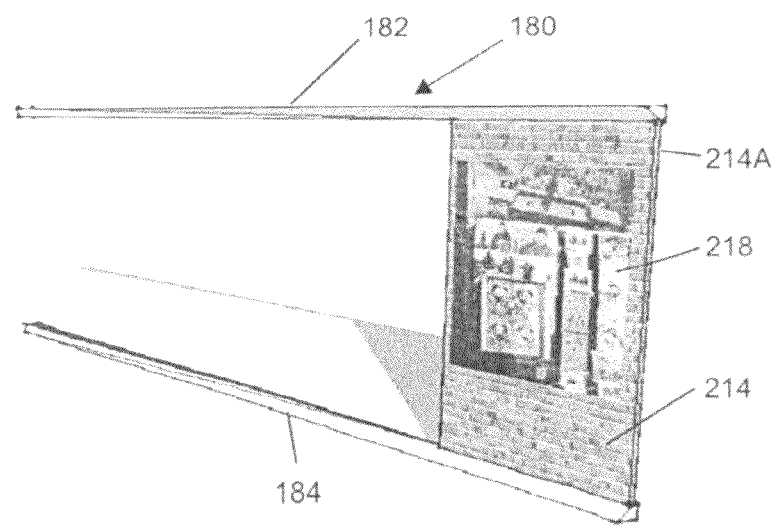

FIGS. 10A-10C illustrate a different manner in which a structure 170 that can be converted into an immersive training structure. To convert the structure 170, a track system 180 can be installed into which textured wall segments 190 can be slid and secured to permit an easy changing of the façade of structure 170 by permitting an easy changing of the textured wall segments 190. As shown in FIG. 10A, track system 180 can be secured along outer walls of structure 170, such as outer wall 172. In particular, track system 180 can include an upper track 182 secured to an upper portion 174 of outer wall 172 and a lower track 184 secured to a lower portion 176 of outer wall 172. Upper and lower tracks 182, 184 extend outward from the wall 172 and each include a channel 186 formed within the respective track 182, 184. The channel 186 in the upper track 182 faces downward toward the lower track 184 and the channel 186 in the lower track 184 faces upward toward the upper track 182 to provide a frame into which textured wall segments 190 can be inserted.

As described above, textured wall segments 190 can have a textured outer surface to which a wrapping material panel 194 with a printed outer surface 194A of an image that can generally correspond with the textured outer surface of the textured wall segments 190 to help create at least a portion of a realistic looking facade on the structure 170. In some embodiments, for example, the textured outer surface of the textured wall segments 190 can be painted instead covered with a wrapping material to enhance the appearance of the façade being created. In such embodiments, the textured outer surface of the textured wall segments 190 can be both covered by the wrapping material and painted.

Textured wall segments 190 can be sized so that ends 192A and 192B of textured wall segments 190 can have at least a portion that can fit into and slide within the channels 186 of the tracks 182, 184. For example, upper end 192A can slide in channel 186 of the upper track 182 at the same time that upper end 192B slides in channel 186 of the lower track 184. In this manner, the track system 180 helps to hold the textured wall segments 190 in place on the structure 170 to create the intended façade. To facilitate the sliding of ends 192A and 192B of textured wall segments 190 within the channels 186 of the tracks 182, 184, rollers or friction-reducing material can reside within the channels. With the use of the track system 180, the need for other securing mechanisms to secure the textured wall segments 190 to the structure 170 is reduced. For example, fewer, if any, securing mechanisms such as adhesives, screws, bolts, or the like are needed to hold textured wall segments 190 to the structure 170 as compared to embodiments where a track system is not used.

As described above, the textured wall segments 190 are configured so that the textured wall segments 190 and the corresponding wrapping material panel 194 with its printed outer surface 194A of an image can be matched and aligned to create a whole larger image that creates the façade over wall 172 of the structure 170 as described above. Thus, when an edge 192C of a textured wall segment 190 abuts against an edge 192C of a correctly positioned neighboring textured wall segment 190 the images on the printed outer surfaces 194A of wrapping material panels 194 matchingly align to create a larger continuous image.

To insert the ends 192A and 192B of textured wall segments 190 into channels 186 of the tracks 182, 184 end caps 188 of the tracks 182, 184 can be removed. The textured wall segments 190 can then be slid to proper position. Though not shown, a rear end 178 of the structure 170 can also have similar tracks of track system 180 at upper and lower ends of the rear ends 178 to provide a façade thereon. If tracks are installed on rear end 178, textured wall segments 190 can cover doors 178A and 178B.

FIGS. 10B and 10C illustrates the track system 180 separated from the structure 170. Such a track system 180 can be used on interior or exterior walls. For embodiments of an immersive training system that employs a track system 180, two-sided textured wall segments 210 can be used to permit the textured wall segments 210 to be flipped to create a first façade when properly aligned first sides 212 are facing outward from the structure on which the track system 180 is attached and a second façade when properly aligned second sides 214 are facing outward from the structure on which the track system 180 is attached. For example, two-sided textured wall segment 210 can have a first side 212 that can include an image and textured surface 212A that depicts a stone façade. A poster 216 can be either a part of the image and textured surface 212A or attached to the first side 212. Similarly, two-sided textured wall segment 210 can have a second side 214 that can include an image and textured surface 214A that depicts a brick façade. A poster 218 can be either a part of the image and textured surface 214A or attached to the second side 214. The poster 216 can depict images from a different culture that the images on the poster 218. Similar, the poster 216 can be in a different language from the poster 218. For example, poster 216 can be in Farsi, while poster 218 can be in Arabic. While not every two-sided textured wall segment 210 may have a poster, such added features can added a level of realism to the training, especially when it reflects the society of the environment of the mission site for which training is occurring.

In this manner, the immersive training system in which the track system 180 is used can be easily and quickly changed between two different training scenarios by removing, flipping, and properly aligning two-sided textured wall segment 210. Such capabilities permit a training site to training different groups of personnel within a close proximity of time using the same structure or structures.

To help facilitate the ease of use of such two-sided textured wall segments 210 in the track system 180, the ends of the two-sided textured wall segment 210 that engage the track system 180 and/or the track system 180 can be modified toe fit into the upper track 182 or lower track 182, respectively. For example, the ends of the two-sided textured wall segment 210 can have a "T"-shaped construction sized to fit into the track securely, while still allowing the segments movement in the track as it pertains to installing, fixing or flipping the segments. The segment's "T"-shaped end portion can be sufficiently rigid, and can help lend adequate support for the two-sided textured wall segment 210 in the track system 180, since it can comprise two adhered rear facing segment portions as will be explained below.

In another embodiment, the two-sided textured wall segment 210 can have an adhesive foam spacer that can be affixed to one or both sides of the upper and lower ends of the two-sided textured wall segment 210. The adhesive foam spacers can compress to allow the segment to snugly fit into the track, but cannot be viewed from outside the track's face. The adhesive foam spacers also can aid in allowing the two-sided textured wall segment 210 to slide along the track and into place.

Figure 11A:
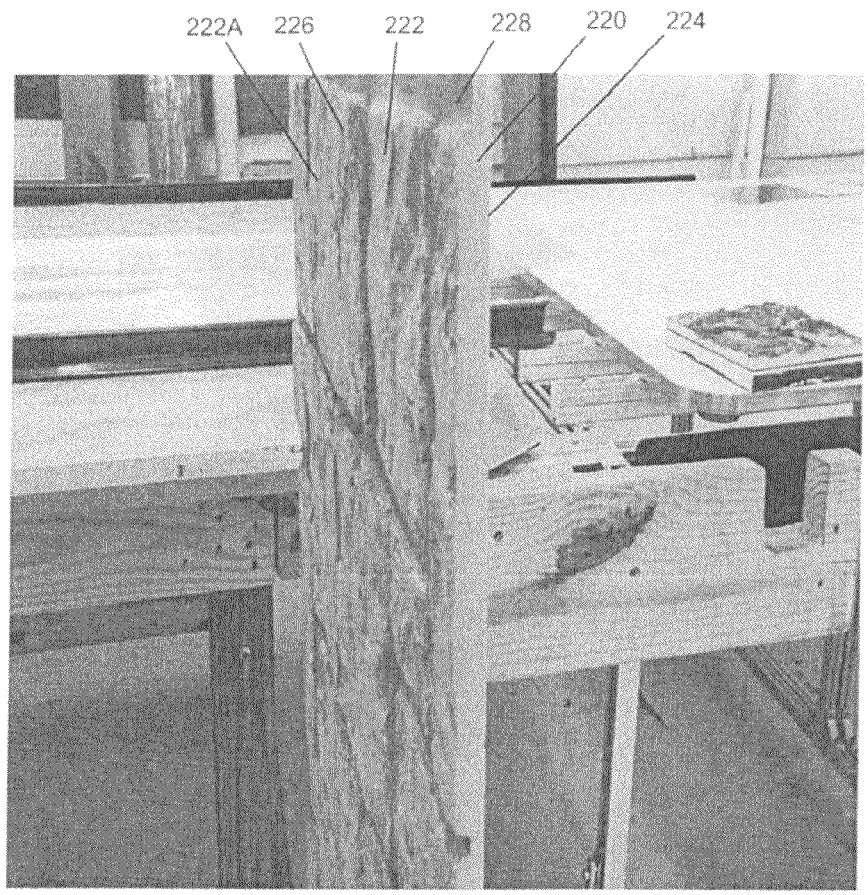
FIGS. 11A-11D illustrate perspective views of embodiments of components used to create an embodiment of a wall segment for use in replicating a structure to be simulated according to the present subject matter.

FIGS. 11A-11D illustrate how an embodiment a two-sided textured wall segment 238 can be structured. FIG. 11A illustrates a first segment 220 that can be used to create a two-sided textured wall segment 238. The first segment 220 can include a front side 222 that includes a textured outer surface 222A. The textured outer surface 222A of the front side 222 can be painted or have a wrapping material panel 226 with a image printed thereon secured to textured outer surface 222A to create at least a portion of a façade that can be secured to a structure. As shown in FIGS. 11A-11D, front side 222 depicts cut stone wall portion. The first segment 220 can include a generally smooth and/or flat back side 224. The first segment 220 can include an upper end 228 that is indent or inset relative to front side 222. Similarly, a lower end (not shown) can also have such an indent or inset relative to front side 222.

Figure 11B:
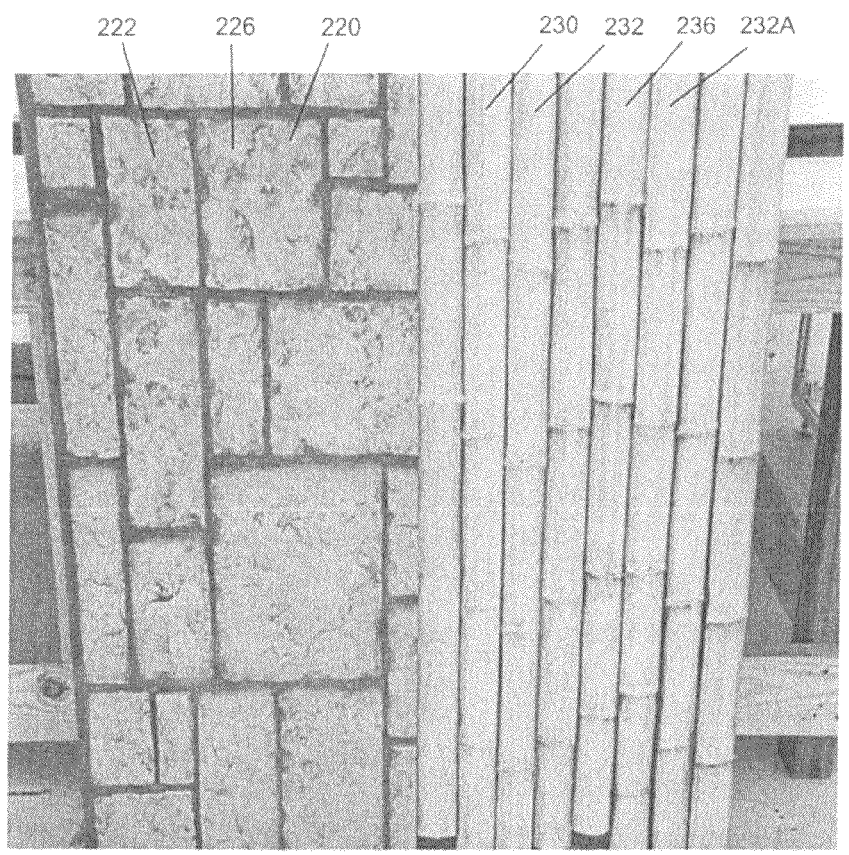
Figure 11C:
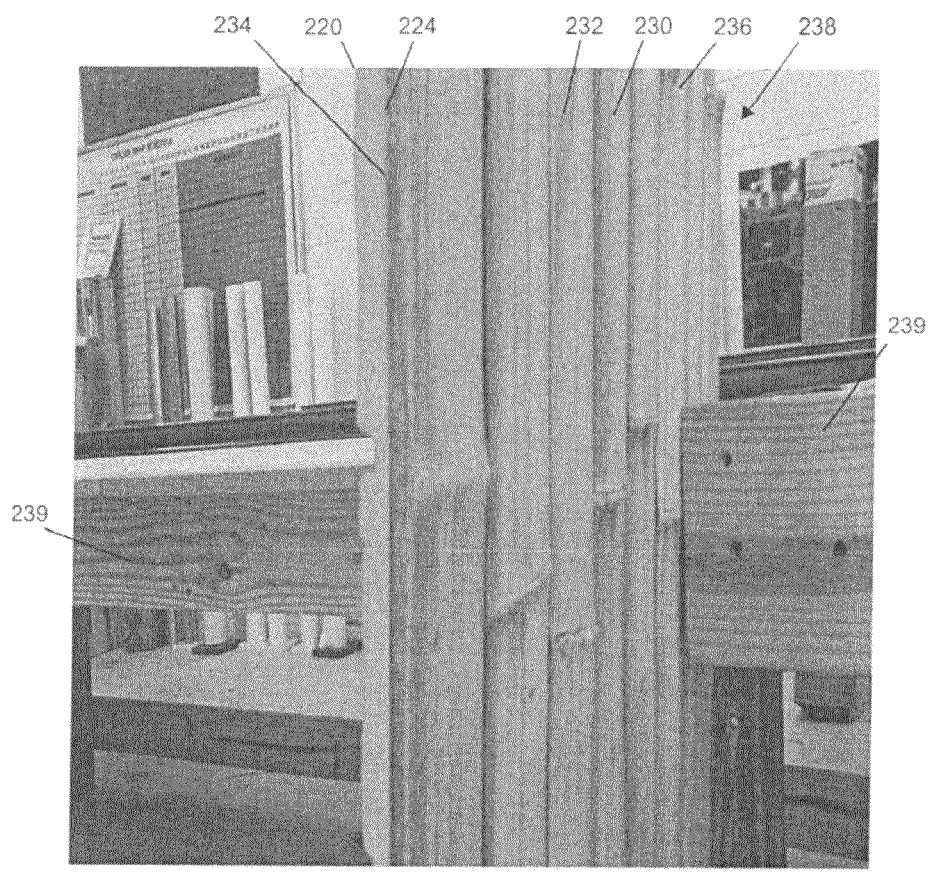
Figure 11D:
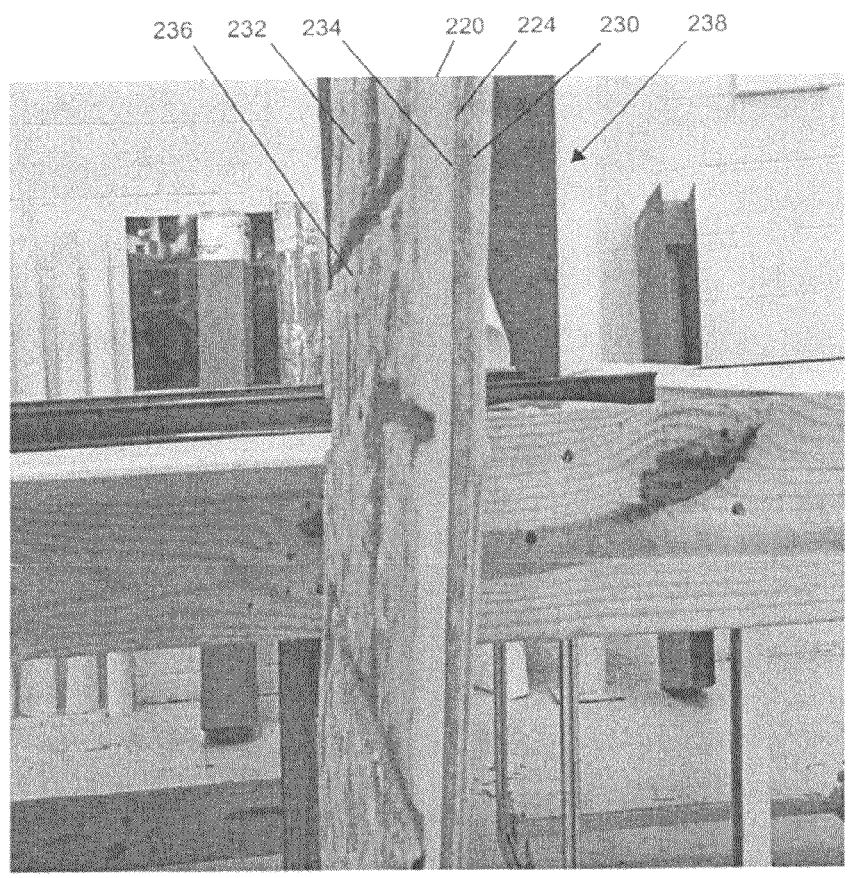

A second segment 230 can also be provided. The second segment 230 can include a front side 232 that includes a textured outer surface 232A. As with first segment 222, the textured outer surface 232A of the front side 232 can be painted or have a wrapping material panel 236 with a image printed thereon secured to textured outer surface 222A to create at least a portion of a façade that can be secured to a structure. As shown in FIGS. 11B-11D, front side 232 depicts a bamboo wall portion. The second segment 230 can include a generally smooth and/or flat back side 234. Ends (not shown) of the second segment 230 can have such indents or insets relative to front side 232.

As shown in FIGS. 11C and 11D, the flat back side 224 of the first segment 220 can be aligned with and secured to the flat back side 234 of the second segment 230 to create a two-sided textured wall segment 238. For example, an adhesive can be applied one or both of the back sides 224, 234 of the respective first and second segments 220, 230. Alternatively, first and second segments 220, 230 can be secured by mechanical mechanisms such as screws, bolts and nuts, matching features such as interlocking sections on the respective back sides, or the like. The indented or inset ends of the respective first and second segments 220, 230 can also align to form insert ends on the two-sided textured wall segment 238 for use in a track system 180 (FIGS. 10A-10C). The use of such two-sided textured wall segments 238 in a track system 180 can permit training scenarios to be easily and quickly changed between by removing, flipping, and properly aligning two-sided textured wall segment 238.

Figure 12A:
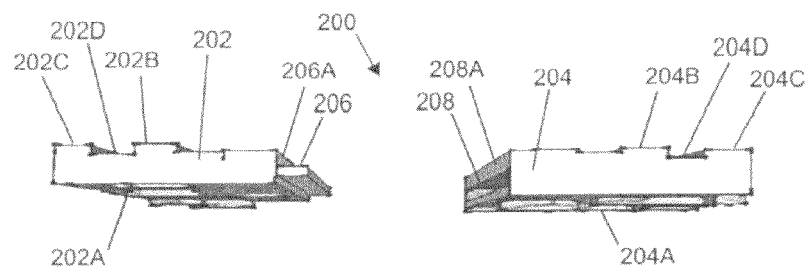
FIG. 12A illustrates a top perspective view of an embodiment of wall segment that can be used to replicate a structure to be simulated according to the present subject matter.
Figure 12B:
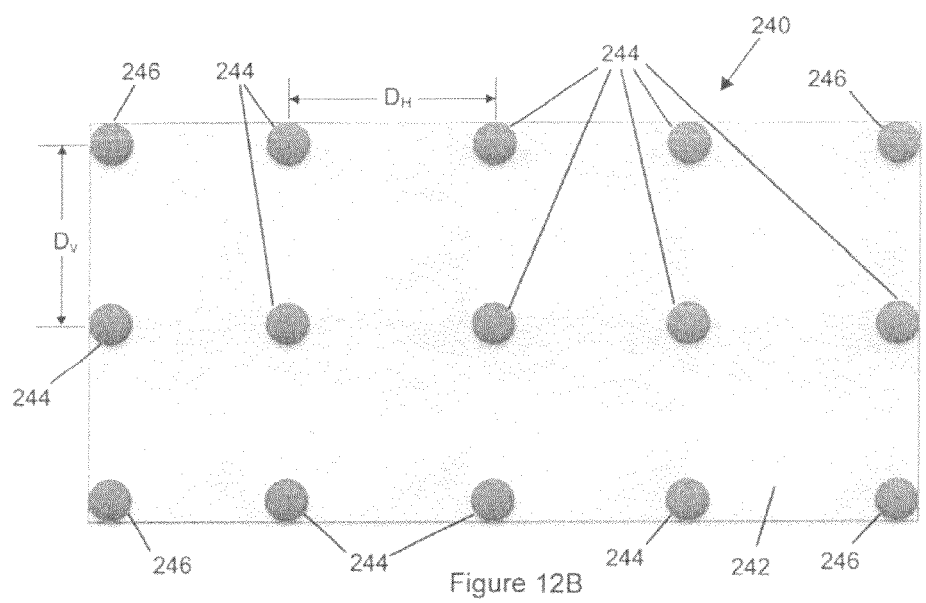
FIG. 12B illustrates a side view of an embodiment of a securement board that can be used to replicate a structure to be simulated according to the present subject matter.

FIGS. 12A and 12B illustrate different mechanisms and designs that can be used to help secure textured wall segments to a structure. FIG. 12A illustrates a façade system 200 that includes two or more textured wall segments 202, 204. The first textured wall segment 202 comprises a front side 202A that can include a textured outer surface that can be painted or have a wrapping material panel with an image printed thereon secured to the textured outer surface. The first segment 202 can also include a back side 202B. Back side 202B can have protrusions 202C and indentions 202D that alternate.

Similarly, the second textured wall segment 204 comprises a front side 204A that can include a textured outer surface that can be painted or have a wrapping material panel with an image printed thereon secured to the textured outer surface. The second segment 204 can also include a back side 204B. Back side 204B can have protrusions 204C and indentions 204D that alternate.

Additionally, first segment 202 can include a plug 206 that extends from a side 206A and second segment 204 can have a recess 208 in a side 208A. The plug 206 of the first segment 202 can be configured to engage the recess 208 to create an interlocking joint between the segments 202, 204. In this manner, the segments 202, 204 can quickly and easily be properly aligned. The interlocking joint of the plug 206 and recess 208 can also help to hold the segments 202, 204 together. The interlocking joint of the plug 206 and recess 208 can further aid in securement of the segments 202, 204 to a structure to create a façade by further limiting the number other securement mechanism that may be necessary to attach segments 202, 204 to the structure.

For some structures on which a façade is to be attached, protrusions 202C, 204C and indentions 202D, 204D on the respective back sides 202B, 204B of the segments 202, 204 can also facilitate in the securement of the segments 202, 204 to the structures. In particular, structures, like conex containers, that have corrugated walls that have inversely matching protrusions and indentions. By properly aligning and positioning the back sides 202B, 204B of the segments 202, 204 relative to the walls of a structure, the protrusions 202C, 204C and indentions 202D, 204D on the back sides 202B, 204B can engage the inversely matching protrusions and indentions of the walls of the structure. This engagement helps to hold the segments 202, 204 in place on the structure. In this manner, the need for other securement mechanisms to hold the segments 202, 204 in place can be lessened.

FIG. 12B illustrates a securement board 240 that can be attached to a wall of the structure to facilitate the attachment of textured wall segments to a structure. The securement board 240 can have segment securing apertures 244 at predetermine locations along the board 240. Board securing apertures 246 can be used to attach the securement board 240 to the structure. Board securing apertures 246 can be certain designated securing apertures 244, or other additionally apertures (not shown in FIG. 12B).

The securement board 240 can be attached to a structure by inserting fastener members such as screws or bolts through the board securing apertures 246 and into the structure. The segment securing apertures 244 can be used to attach textured wall segments to the securement board 240. For example, once texture wall segments are placed against surface 242 of securement board 240, fastener members such as screws or bolts can pass through the texture wall segments and engage the segment securing apertures 244 without entering the respective wall of the structure.

The segment securing apertures 244 can be equally spaced in a matrix such that each segment securing aperture 244 is spaced at a distance $D_H$ from its immediate horizontal neighbor(s) and is spaced at a distance $D_V$ from its immediate vertical neighbor(s). In this manner, by knowing the predetermined location of the fastener members and set engagement of the fastener members used to attach the textured wall segments with the securement board 244, the textured wall segments can be more quickly and easily be removed from the structure.

Figure 13A:
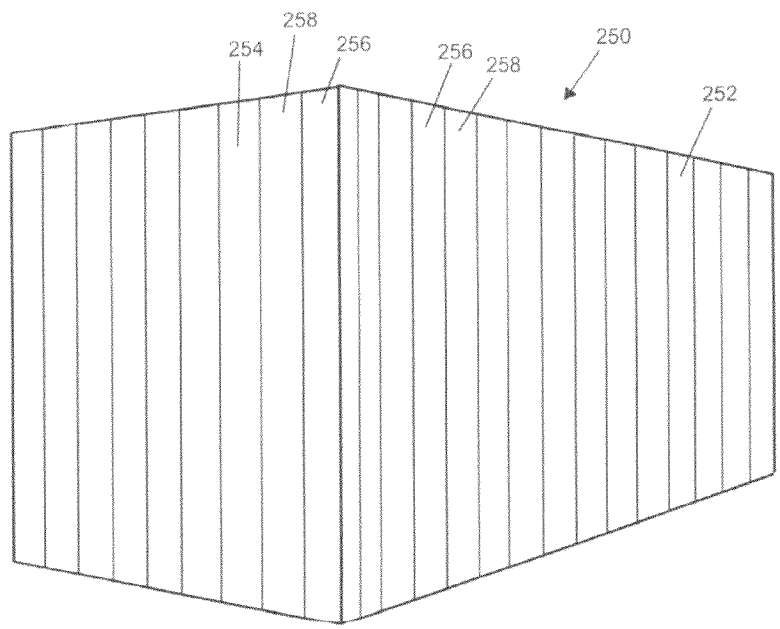
FIGS. 13A-13F illustrates embodiments of steps and components that can be used to replicate a structure to be simulated according to the present subject matter.
Figure 13B:
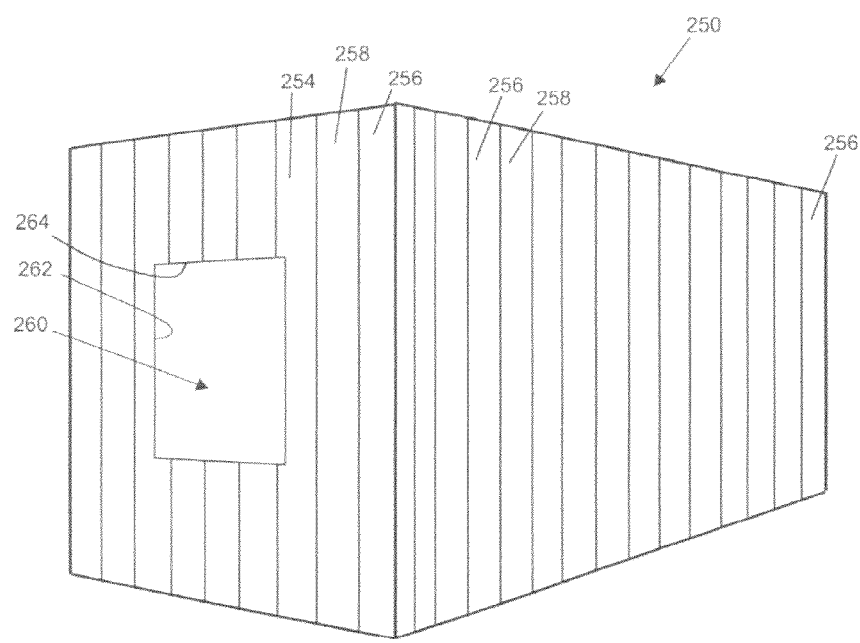
Figure 13C:
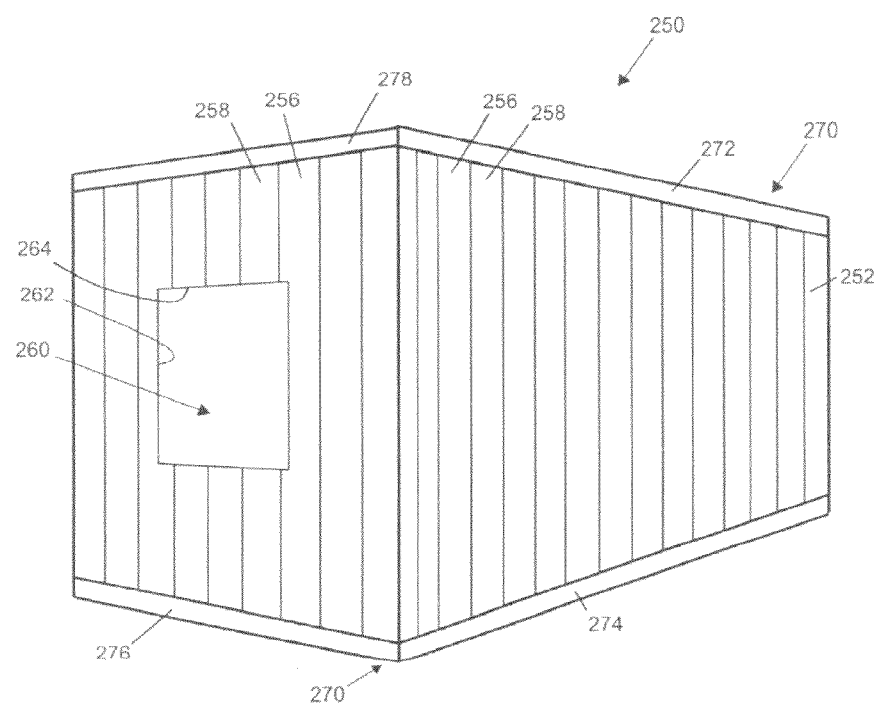
Figure 13D:
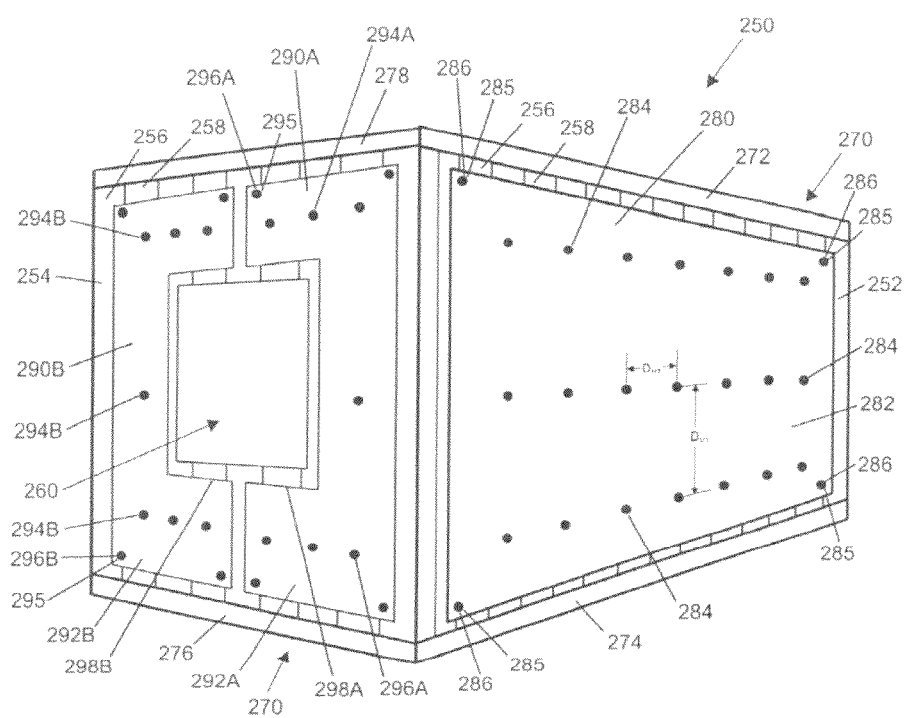

FIGS. 13A-13F illustrate schematics of a further embodiment of an immersive training system and related method. A structure 250 can be provided as a base structure as shown in FIG. 13A. Structure 250 as a base structure can be for example a conex container, a permanent shoot house, a portion of a modular unit facility, or the like. The structure 250 can include walls 252 and 254. In the embodiment shown, the walls 252, 254 can be corrugated such that protrusion 256 and indentions 258 are create in a vertical direction along the walls 252, 254. Alternatively, the walls 252, 254 can be flat. Such a structure 250 can be manipulated in different ways to meet the needs of the modern urban operations training for which the structure 250 is to be used. For example, windows and doorways can be created or cut into the walls of such a structure and if necessary multiple such structures can be linked and or stacked to meet such needs. For instance, as shown in the embodiment, a window 260 can be cut wall 254. The window can be defined by edges 262, 264 that can be sealed and framed to more accurately depict the mission environment or mission site as needed.

To convert the structure 250 into a modern urban operations training facility, a track system 270 can be added along one or more walls, for instance, all four walls. For example, an upper track 272 and a lower track 274 can create a portion of the track system 270 along wall 252. For wall 254 of the structure 250, an upper track 278 and lower track 276 can also create a portion of the track system 270 along that wall. The track system 270 can be set up to permit the tracks 272, 274, 276, 278 to receive textured wall segments on at least one end at an entrance (not shown). Inserts (not shown) can be attached at the entrances. The inserts can have width and dimension shapes that can permit the squaring off of the corners of the structure by aligning with insert wall segments. The inserts can then be wrapped with appropriately printed and aligned wrapping panels to seamless conceal the corners of the structure 250.

To facilitate the ability to attach and remove wall segments, securement boards can be attached to the walls of structure 250. For example, a long securement board 280 can be attached to the long wall 252 of structure 250. The long securement board 280 can have board securing apertures 286. Board securing apertures 286 can be used to attach the securement board 280 to the structure 250. The number of board securing apertures 286 can be limited to the number of fasteners needed to securely hold the board 280 and the wall segments to be attached to the structure 250 to withstand the rigors of modern urban operations training. Thus, the number of fastener members can depend on, for example, the weight of the board 280 and the wall segments to be attached, the strength of the fastener members and the type of training to be performed. In the embodiment shown in FIGS. 13D and 13E, board 280 has four board securing apertures 286, each of which are engaged by a fastener member 285 to secure the board 280 to the structure 250. As with the embodiment of the structure 250 shown where wall 252 is corrugated, the board securing apertures 286 can align with protrusions 256 for easy and more stable attachment.

The long securement board 280 can have segment securing apertures 284 at predetermine locations along the board 280. The segment securing apertures 284 can be equally spaced in a matrix such that each segment securing aperture 284 is spaced at a distance $D_{H1}$ from its immediate horizontal neighbor(s) and is spaced at a distance $D_{V1}$ from its immediate vertical neighbor(s). Thus, with the predetermined location for placement of the fastener members known and having uniform apertures 284 that are dimensioned for easy engagement with fastener members with the securement board 280, the textured wall segments can be more quickly and easily attached and removed from the structure. As with the embodiment of the structure 250 shown where wall 252 is corrugated, the segment securing aperture 284 can align with indentions 258, but are not required to be.

Wall 254 of structure 250 can have two securement boards 290A, 290B to accommodate window 260. As with securement board 280, each securement board 290A, 290B can have respective segment securing apertures 294A, 294B at predetermine locations along each board 290A, 290B. Board securing apertures 296A, 296B can be used to attach the securement boards 290A, 290B to the structures. To further accommodate for the inclusion of window 260 in the structure 250, each securement board 290A, 290B can include a respective recess 298A, 298B. In this manner, the wall segments attached around the top and bottom of the window can be better secured.

Figure 13E:
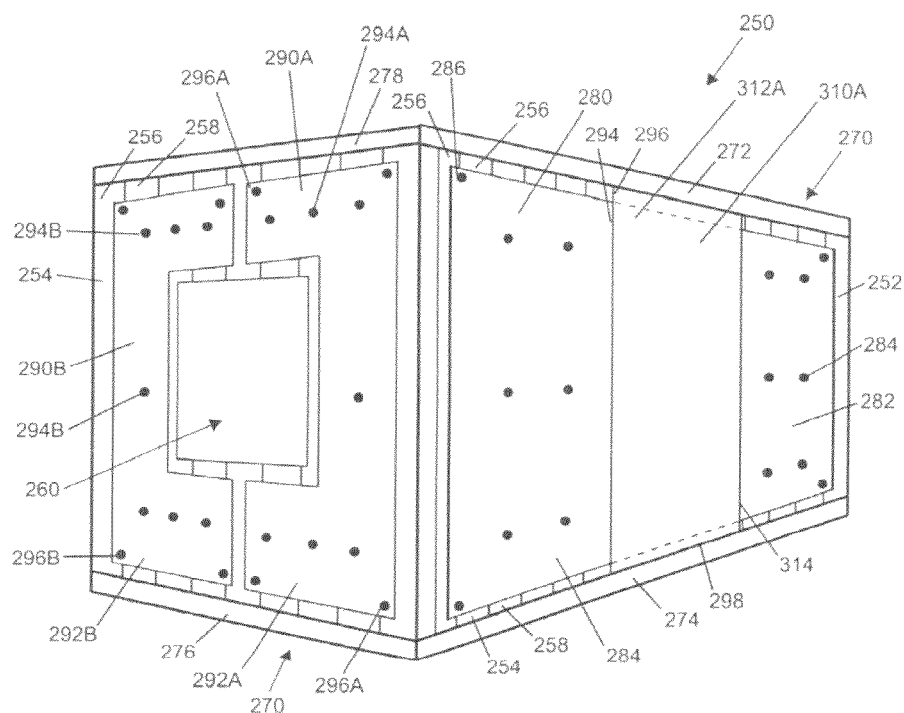
Figure 13F:
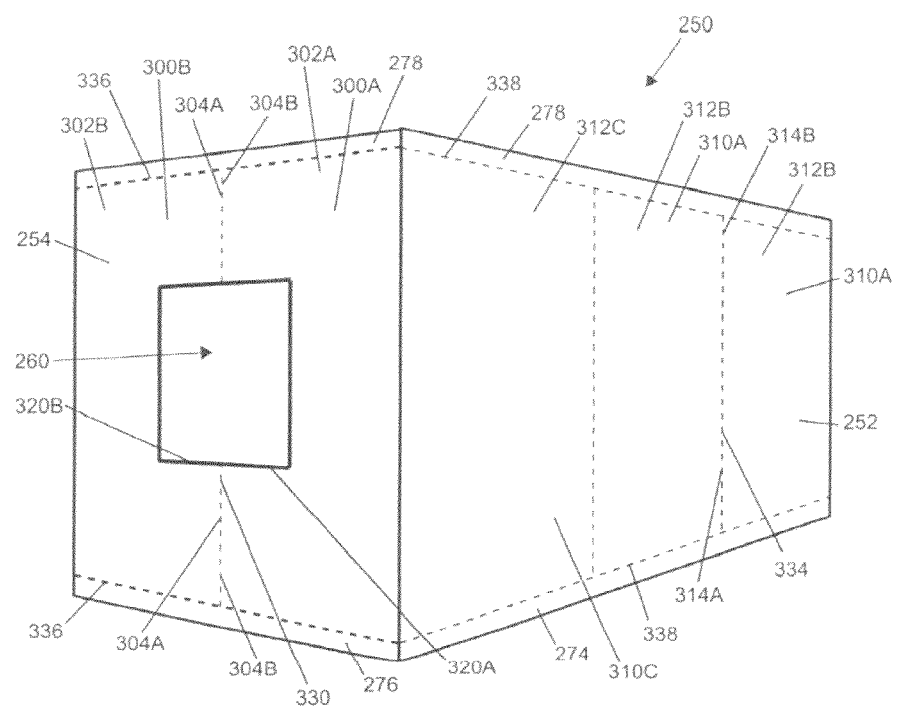

As shown in FIGS. 13E and 13F, wall segments 310A, 310B and 310C can be inserted into the tracks 272, 274 of track system 270 to form a façade along wall 252. After insertion and proper alignment of wall segment 310A, 310B, 310C, wall segments 310A, 310B, 310C can be secured to securement board 280. Each wall segment 310A, 310B, 310C can include imagery on its respective outer surface 312A, 312B, 312C as described above that when aligned creates a full coherent image of the façade. For example, the edge 314A of wall segment 310A can abut with the edge 314B of wall segment 310B so that the imagery on outer surface 312A can aligns with imagery on outer surface 312B to make a generally continuous image. The number of wall segments 310A, 310B, 310C can be vary depending on the size of the wall segments and the size of the structure 250.

Similarly, wall segments 300A and 300B can be inserted into the tracks 276, 278 of track system 270 to form a façade along wall 254. After insertion and proper alignment of wall segment 300A, 300B, wall segments 300A, 300B can be secured to the respective securement boards 290A, 290B. Each wall segment 300A, 300B can include a respective recess 298A, 298B to accommodate for the inclusion of window 260 in the structure 250. As above, each wall segment 300A, 300B can include imagery on its respective outer surface 302A, 302B that when aligned creates a full coherent image of the façade on wall 254 of structure 250. For example, the edge 304A of wall segment 300A can abut with the edge 304B of wall segment 300B so that the imagery on outer surface 302A can aligns with imagery on outer surface 302B to make a generally continuous image.

As needed or desired, seams 330, 334 formed where wall segments 300A, 300B, 310A, 310B, 310C abut against each other and seams 336, 338 formed between where wall segments 300A, 300B, 310A, 310B, 310C and the tracks 272, 274, 276, 278 of track system 270 can be painted or covered by appropriate sized wrapping material panels with proper imagery printed thereon to conceal these seams. In such embodiments Such structures as simulated structures 10, 110, and 250 can be arranged into a grouping of buildings to provide a comprehensive immersive training environment. These groupings can be arranged to simulate villages or sections of a city for training military, law enforcement or first responder personnel. Such groupings can be used in training mounted (i.e., residing on a vehicle) or dismounted personnel. The number of simulated structures in a grouping can range from 1 simulated structure to over 400 simulated structures. Further, the number of personnel trained in such groupings of simulated structures can range from 1 personnel to over 4,000 personnel. For example, a brigade combat team of the U.S Army can train in such a grouping of simulated structures. In one embodiment, such a grouping of simulated structures can be arranged as a village in central Iraq for the purpose of realistic counter-IED training.

Through the structures, systems and processes described above, situational realism is created by replicating or accurately simulating structures at mission sites and environments through the use of a variety of data to create urban mapping and visualization intelligence. The urban mapping and visualization intelligence can be used to accurate create facades and imagery for structures that create visual and textural realism for the structures used in the training. Additionally, systems and processes described above can be used to permit quick convertible ability of structures to immersive training structures through attachment of facades in quick and easy manners. These structures, systems and processes allow the replication of an operational environment for a realistic training and mission rehearsal environment.

Embodiments of the present disclosure shown in the drawings and described above are exemplary of numerous embodiments that can be made within the scope of the appending claims. It is contemplated that the configurations of the immersive training scenario systems and related methods for making the same can comprise numerous configurations other than those specifically disclosed. The scope of a patent issuing, from this disclosure will be defined by these appending claims.

What is claimed is:

1. A system for creating a simulated structure for urban operations training based on a structure to be simulated, the system comprising:
    data collection apparatuses for collecting data specific to a structure to be simulated;
    a data processor for analyzing the data to create an accurate depiction of the structure to be simulated and generating accurate visual imagery of the structure to be simulated;
    a base structure having at least one wall thereon;
    one or more wall segments having an outer textured surface with varied indentions meant to reflect the texture of an outer surface of the structure to be simulated, the one or more wall segments being securable to the at least one wall of the base structure; and
    one or more wrapping material panels with the visual imagery generated by the data processor printed thereon for application to the outer textured surface of the one or more wall segments so that the simulated structure has realistic visual characteristics representative of a mission site or a mission scenario.

2. The system according to claim 1, wherein the data processor analyzes the data to generate accurate textural imagery with the outer textured surface created based on the textural imagery generated by the data processor and the accurate depictions of the structure to be simulated and the accuracy of the textural and visual imagery created is based on a redundancy of data found in the data collected and analyzed.

3. The system according to claim 1, further comprising a track system comprising a plurality of tracks that are attached to the at least one wall of the base structure, the one or more wall segments being insertable into at least one of the tracks of the track system.

4. The system according to claim 3, wherein each wall segment has two sides with a different textured outer surface on each side to permit either side to be used as an outer surface of the simulated structure.

5. The system according to claim 4, wherein a different wrapping material panel of the one or more wrapping material panels having a different image thereon is applied to each side of each wall segment.

6. The system according to claim 1, further comprising a securement board that is attachable to at least one wall of the base structure for securing the one or more wall segments to the securement board.

7. The system according to claim 1, wherein the one or more wrapping material panels comprise polyvinyl chloride film.

8. A simulated structure for urban operations training, the structure comprising:
    a base structure having at least one wall thereon;
    one or more wall segments having a textured outer surface with varied indentions, the one or more wall segments secured to the at least one wall of the base structure; and
    one or more wrapping material panels with one or more images printed thereon applied to the textured surface of the one or more wall segments so that the simulated structure has realistic visual characteristics representative of a mission site or a mission scenario.

9. The structure according to claim 8, further comprising a track system comprising a plurality of tracks that are attached to the at least one wall of the base structure, the one or more wall segments being insertable into at least one of the tracks of the track system.

10. The structure according to claim 9, wherein each wall segment has two sides with a different textured outer surface on each side to permit either side to be used as an outer surface of the simulated structure.

11. A simulated structure for urban operations training, the structure comprising:
    a base structure having at least one wall thereon;
    one or more wall segments having a textured outer surface, the one or more wall segments for securement to the at least one wall of the base structure, each wall segment having two sides with a different textured outer surface on each side to permit either side to be used as an outer surface of the simulated structure;
    one or more wrapping material panels with one or more images printed thereon applied to the different textured surfaces of the one or more wall segments; and
    a different wrapping material panel of the one or more wrapping material panels having a different image thereon is applied to each side of each wall segment so that the simulated structure has realistic visual characteristics representative of one or more mission sites or mission scenarios.

12. The structure according to claim 8, further comprising a securement board that is attachable to at least one wall of the base structure for securing the one or more wall segments to the securement board.

13. The structure according to claim 8, wherein the one or more wrapping material panels comprise polyvinyl chloride film.

14. The structure according to claim 8, wherein the one or more wall segment comprise interlocking joint sections.

15. The structure according to claim 8, wherein, upon application of the one or more wrapping material panels, the visual imagery matches and aligns with the outer textured surface of the one or more wall segments.

16. The structure according to claim 8, wherein the base structure comprises a conex container comprising corrugated walls and the one or more wall segments are configured to cover the corrugated walls of the conex container.

17. The structure according to claim 16, wherein the one or more wall segments comprise protrusions and indentions on a back side of the one or more wall segments that faces the corrugated walls of the conex container so that the protrusions and indentions on the back side of the one or more wall segments engage protrusions and indentions of the corrugated walls of the conex container.

18. The structure according to claim 16, further comprising securement boards attached to the corrugated walls of the conex container with the one or more wall segments being secured to the securement board.

19. The structure according to claim 8, wherein the at least one base structure comprises a modular structure and the simulated structure comprises multiple modular structures arranged together to form the simulated structure, the one or more wrapping material panels with one or more images printed thereon applied to the surface of each modular structure being aligned with the one or more wrapping panels on the surfaces of the other modular structures to create a visual appearance of the modular structures as the singular simulated structure.

20. The system according to claim 1, wherein, upon application of the one or more wrapping material panels, the visual imagery matches and aligns with the outer textured surface of the one or more wall segments.

21. The system according to claim 1, wherein the base structure comprises a conex container comprising corrugated walls and the one or more wall segments are configured to cover the corrugated walls of the conex container.

22. The system according to claim 21, wherein the one or more wall segments comprise protrusions and indentions on a back side of the one or more wall segments that faces the corrugated walls of the conex container so that the protrusions and indentions on the back side of the one or more wall segments are engagable with protrusions and indentions of the corrugated walls of the conex container.

23. The structure according to claim 21, further comprising securement boards being attachable to the corrugated walls of the conex container with the one or more wall segments being securable to the securement board.

24. The system according to claim 1, wherein the at least one base structure comprises a modular structure and each simulated structure comprises multiple modular structures arranged together to form the at least one simulated structure, the one or more wrapping material panels with one or more images printed thereon applied to the surface of each modular structure being aligned with the one or more substrates on the surfaces of the other modular structures to create a visual appearance of the modular structures as a singular simulated structure.

25. The system according to claim 24, wherein the system comprises multiple simulated structures, each of the simulated structures positioned relative to the other simulated structures to create the realistic visual characteristics representative of the mission site or the mission scenario for military, law enforcement or other first responder personnel.

* * * * *